(12) United States Patent
Chatterjee et al.

(10) Patent No.: US 9,723,055 B2
(45) Date of Patent: Aug. 1, 2017

(54) SYSTEM AND METHOD FOR ACCELERATION OF A SECURE TRANSMISSION OVER SATELLITE

(71) Applicant: Gilat Satellite Networks Ltd., Petah-Tikva (IL)

(72) Inventors: Aditya N. Chatterjee, Montgomery Village, MD (US); Roberto Guimaraes, McLean, VA (US); Hanny P. Kadrichu, North Potomac, MD (US); Steven Bowers, Herndon, VA (US)

(73) Assignee: Gilat Satellite Networks Ltd., Petah-Tikva (IL)

( * ) Notice: Subject to any disclaimer, the term of this patent is extended or adjusted under 35 U.S.C. 154(b) by 727 days.

(21) Appl. No.: 14/271,937

(22) Filed: May 7, 2014

(65) Prior Publication Data
US 2015/0288738 A1 Oct. 8, 2015

Related U.S. Application Data

(60) Division of application No. 13/596,509, filed on Aug. 28, 2012, now Pat. No. 8,762,478, which is a (Continued)

(51) Int. Cl.
*G06F 15/16* (2006.01)
*H04L 29/08* (2006.01)
(Continued)

(52) U.S. Cl.
CPC ........... *H04L 67/02* (2013.01); *H04B 7/1858* (2013.01); *H04B 7/18582* (2013.01);
(Continued)

(58) Field of Classification Search
CPC ............ H04B 7/18589; H04B 7/18595; H04B 7/1858; H04B 7/18582; H04L 67/02;
(Continued)

(56) References Cited

U.S. PATENT DOCUMENTS

| | | | |
|---|---|---|---|
| 5,673,322 A | 9/1997 | Pepe et al. | |
| 5,706,507 A | 1/1998 | Schloss | |

(Continued)

FOREIGN PATENT DOCUMENTS

| | | |
|---|---|---|
| EP | 0788246 A2 | 8/1997 |
| JP | 55-120249 | 9/1980 |

(Continued)

OTHER PUBLICATIONS

U.S. Appl. No. 14/607,202, Decentralized Caching System, filed Jan. 28, 2015.
(Continued)

*Primary Examiner* — John Macilwinen
(74) *Attorney, Agent, or Firm* — Banner & Witcoff, Ltd.

(57) ABSTRACT

A broadband communication system with improved latency is disclosed. The system employs acceleration of secure web-based communications over a satellite communication network. In accordance with aspects of the invention, secure protocol acceleration is employed such that required protocol signals transmitted from a computer employing a web browser may be intercepted by a remote terminal. To insure that the browser will continue transmitting data, the remote terminal generates required acknowledgment and security signals to continue the secure communication, which may then transmitted back to the computer. Meanwhile, the received protocol signals may be converted by the remote terminal for transmission through the satellite communications system in a format appropriate for that communication medium. Aspects of the invention further include a hub or
(Continued)

similar device for communicating with the satellite communications system.

19 Claims, 11 Drawing Sheets

Related U.S. Application Data continuation of application No. 10/303,722, filed on Nov. 26, 2002, now Pat. No. 8,281,029, which is a continuation-in-part of application No. 09/781,554, filed on Feb. 13, 2001, now Pat. No. 6,947,440.

(60) Provisional application No. 60/262,647, filed on Jan. 22, 2001, provisional application No. 60/182,537, filed on Feb. 15, 2000.

(51) Int. Cl.
*H04B 7/185* (2006.01)
*H04L 12/18* (2006.01)
*H04L 29/12* (2006.01)
*H04L 29/06* (2006.01)

(52) U.S. Cl.
CPC ...... *H04L 12/1836* (2013.01); *H04L 61/1511* (2013.01); *H04L 63/0428* (2013.01); *H04L 67/288* (2013.01); *H04L 67/2842* (2013.01); *H04L 67/2847* (2013.01); *H04L 12/189* (2013.01); *H04L 69/329* (2013.01)

(58) Field of Classification Search
CPC ............. H04L 61/1511; H04L 63/0428; H04L 67/2842; H04L 67/288; H04L 67/2847; H04L 12/1836; H04L 69/329; H04L 12/189
See application file for complete search history.

(56) References Cited

U.S. PATENT DOCUMENTS

| | | |
|---|---|---|
| 5,715,445 A | 2/1998 | Wolfe |
| 5,727,129 A | 3/1998 | Barrett et al. |
| 5,754,774 A | 5/1998 | Bittinger et al. |
| 5,761,683 A | 6/1998 | Logan et al. |
| 5,812,545 A | 9/1998 | Liebowitz et al. |
| 5,825,890 A | 10/1998 | Elgamal et al. |
| 5,852,717 A | 12/1998 | Bhide et al. |
| 5,925,100 A | 7/1999 | Drewry et al. |
| 5,929,850 A | 7/1999 | Broadwin et al. |
| 5,987,233 A | 11/1999 | Humphrey |
| 5,991,306 A | 11/1999 | Burns et al. |
| 5,995,725 A | 11/1999 | Dillon |
| 6,003,087 A | 12/1999 | Housel, III et al. |
| 6,016,388 A | 1/2000 | Dillon |
| 6,016,512 A * | 1/2000 | Huitema ........... H04L 29/12066 707/999.1 |
| 6,023,605 A | 2/2000 | Sasaki et al. |
| 6,038,594 A | 3/2000 | Puente et al. |
| 6,078,810 A | 6/2000 | Olds et al. |
| 6,081,900 A | 6/2000 | Subramaniam et al. |
| 6,085,193 A | 7/2000 | Malkin et al. |
| 6,115,384 A | 9/2000 | Parzych |
| 6,115,750 A | 9/2000 | Dillon et al. |
| 6,161,141 A | 12/2000 | Dillon |
| 6,167,438 A | 12/2000 | Yates et al. |
| 6,182,122 B1 | 1/2001 | Berstis |
| 6,205,473 B1 | 3/2001 | Thomasson et al. |
| 6,272,598 B1 | 8/2001 | Arlitt et al. |
| 6,282,542 B1 | 8/2001 | Carneal et al. |
| 6,321,268 B1 | 11/2001 | Dillon et al. |
| 6,338,131 B1 | 1/2002 | Dillon |
| 6,366,947 B1 | 4/2002 | Kavner |
| 6,427,172 B1 | 7/2002 | Thacker et al. |
| 6,449,658 B1 | 9/2002 | Lafe et al. |
| 6,598,048 B2 | 7/2003 | Carneal et al. |
| 6,654,344 B1 | 11/2003 | Toporek et al. |
| 6,658,463 B1 * | 12/2003 | Dillon ............... H04L 29/12132 709/203 |
| 6,711,679 B1 | 3/2004 | Guski et al. |
| 6,742,043 B1 | 5/2004 | Moussa et al. |
| 6,907,429 B2 | 6/2005 | Carneal et al. |
| 6,959,318 B1 | 10/2005 | Tso |
| 6,993,591 B1 * | 1/2006 | Klemm ............... H04L 67/2847 707/999.002 |
| 7,007,062 B1 | 2/2006 | Serenyi et al. |
| 7,130,908 B1 | 10/2006 | Pecus et al. |
| 7,558,837 B1 | 7/2009 | Denny |
| 2001/0003828 A1 * | 6/2001 | Peterson ........... G06F 17/30867 709/219 |
| 2002/0007374 A1 | 1/2002 | Marks et al. |
| 2002/0016911 A1 | 2/2002 | Chawla et al. |
| 2002/0055966 A1 | 5/2002 | Border et al. |
| 2002/0129116 A1 | 9/2002 | Humphrey |
| 2002/0133596 A1 | 9/2002 | Border et al. |
| 2003/0112772 A1 | 6/2003 | Chatterjee et al. |
| 2004/0093419 A1 | 5/2004 | Weihl et al. |
| 2005/0044270 A1 * | 2/2005 | Grove ............... H04L 29/12066 709/238 |
| 2008/0068787 A1 | 3/2008 | Okada |
| 2010/0070570 A1 | 3/2010 | Lepeska |
| 2010/0260254 A1 | 10/2010 | Kimmich et al. |
| 2010/0325670 A1 | 12/2010 | Strong et al. |
| 2011/0194858 A1 | 8/2011 | Rotenstein et al. |

FOREIGN PATENT DOCUMENTS

| | | |
|---|---|---|
| JP | 59-135948 | 8/1984 |
| JP | 60-167533 | 8/1985 |
| JP | 62-189823 | 8/1987 |
| JP | 63-194426 | 8/1988 |
| JP | 4-306934 | 10/1992 |
| JP | 5-157565 | 6/1993 |
| JP | 5-252085 | 9/1993 |
| JP | 5-252087 | 9/1993 |
| JP | 5-252165 | 9/1993 |
| JP | 6-170823 | 6/1994 |
| JP | 6-252896 | 9/1994 |
| JP | 9-508228 | 8/1997 |
| WO | 9905584 A2 | 2/1999 |
| WO | 9908429 A1 | 2/1999 |
| WO | 9916201 A2 | 4/1999 |
| WO | 0042519 A1 | 7/2000 |
| WO | 01/61886 A2 | 8/2001 |

OTHER PUBLICATIONS

Stadler et al. "Performance Enhancement for TCP/IP on a Satellite Channel". IEEE. 1998. pp. 270-276.
Wessels, Duane. "Web Caching" O'Reilly & Associates, 2001. pp. 1-292.
Zheng Wang and Jon Crowcroft, Department of Computer Science, Prefetching in World Wide Web, Communications: The Key to Global Prosperity. Globecom 1996 Internet 96 Conference Record, London, dated Nov. 18, 1996, pp. 28-32. (Abstract).
H. Shrikumar and Rehmi Post, Physics and Computer Science, Thinternet: Life at the End of a Tether, Computer Networks and ISDN Systems, vol. 27, No. 3. (Dec. 1994). pp. 375-385.
Ari Luotonen (1998) Web proxy servers. Netscape Communications Corporation. Cover pp. 170-171.
Office Action in European Patent Application No. 10157847.4-1246, dated Aug. 30, 2011.
Search Report in European Patent Application No. 10157847, dated Apr. 22, 2010.
European Search Report for Application No. 07075087.2 dated Dec. 19, 2007, 7 pages.

(56) References Cited

OTHER PUBLICATIONS

Hua Chen, Marc Abrams, Anup Mathur, Ibraz Anwar and John Stevenson, "Wormhole Caching with HTTP PUSH Method for a Satellite-Based Web Content Multicast and Replication System", Mar. 1999, pp. 1-12, XP002201410.
NetGuard Unveils Guardian Internet Firewall for Windows NT and OS/2 Warp, Dialog File 649: Gale Newswire ASAP 2003 © The Gale Group, Apr. 30, 1996; pp. 1-4.
"Lanoptics Netguard: Netguard ships Guardian version 2.0; Enhanced Firewall product provides unique real time internet management functionality and customizable report information", Dialog® File 810:Business Wire © 1999 Business Wire, Oct. 16, 1996, pp. 1-4.
"Internet World Exhibitors: Fall Internet World '96 Exhibitor Previews—Part Three of Five", Dialog® File 810:Business Wire © 1999 Business Wire, Dec. 3, 1996, pp. 1-11.
Kosuke et al, "Communication Systems Using Line in Common", Patent Abstracts of Japan, Section E, Section No. 579, vol. 12, No. 35, Feb. 2, 1988, p. 120.
Fumitoshi, "Silicon Single-Crystal Substrate", Patent Abstracts of Japan, Section: E, Section No. 1193, vol. 16, No. 166, Apr. 22, 1992, p. 149.
Nobuyuki et al., "Satellite Communication System", Patent Abstracts of Japan, Section: E, Section No. 429, vol. 10, No. 240, Aug. 19, 1986, p. 32.
Katsuhiro et al., "Satellite Communication Equipment", Patent Abstracts of Japan, Section: E, Section No. 1487, vol. 18, No. 10, Jan. 10, 1994, p. 101.
Kazutomo, "Satellite Packet Communication Method", Patent Abstracts of Japan, Section E, Section No. 660, vol. 12, No. 351, Sep. 10, 1988, p. 25.
Brooks et al., "Application-Specific Proxy Servers as HTTP Stream Transducers", http://www.w3.org/conferences/WWW4/papers/56/, Apr. 30, 2003, pp. 1-11.
WWW Collector—The Prefetching Proxy Service for WWW, Wcol: WWW Collector, p. 1.
Zelinka, "Guardian offers a sophisticated, PC-based firewall", Infoworld, http://www.inforworld.com, Jul. 29, 1996, p. 1.
Wang et al., "Prefetching in World Wide Web", Department of Computer Science, University College London, 1995, pp. 1-12.
Shrikumar, "Thinternet: Life at the End of a Tether", Thinternet—Life on a Tether Proc. INET '94/JENC5 H. Shrikumar, pp. 1-14.
Johner et al. LDAP Implementation Cookbook. IBM Redbooks. Jun. 5, 1999. pp. 1-6.
European Search Report for EP Application 12150756, dated May 23, 2012.
Gilat Sky Edgell Spec Sheet, Mar. 14, 2011, satnews.com [online]. http://www.satnews.com/cgl-bln/story.cgl?number=1867514587 [retrieved on Sep. 25, 2012]. Retrieved from: http://www.gilatnetworks.com/data/uploads/ManagemenUSEII_WE.pdf.
Gliat WebEnhance Q&A, Apr. 2011, gilatnetworks.com [online]. http://www.gilatnetworks.com/Content.aspx?Page=WebEnhance [retrieved on Sep. 25, 2012]. Retrieved from: http://www.gilatnetworks.com/data/uploads/ProductPDFs/WebEnhance_QA_2011-04.pdf.
Gliat CacheMode White Paper, Apr. 2011, gilatnetworks.com [online]. http://www.gilatnetworks.com/Contant.aspx?Page=WebEnhance [retrieved on Sep. 25, 2012]. Retrieved from: http://www.gilatnetworks.com/data/uploads/ProductPDFs/CacheMode_White_Paper_2011-04.pdf.
International Search Report—PCT/IB2012/00390—Mailing Date: Oct. 26, 2012.
Introducing WebEnhance, Gilat presentation—2011.
Gilat launches industry first VSAT with MicroSD Multi-Giga Byte Chache memory, Mar. 14, 2011.
SkyEdge II WebEnhance, Gilat Satellite Networks Ltd, 2011, retrieved from http://www.gilatnetworks.com/Content.aspx?Page=WebEnhance on Feb. 2, 2012.
Chawla, Rajeev and Boneh, Dan. U.S. Appl. No. 60/223,171. "Apparatus and Method for Caching Secure Web Content". Aug. 7, 2000. pp. 1-7.
International Preliminary Report on Patentability—PCT/IB2012/000390—Date of issuance: Mar. 25, 2014.
Charles Brooks, Murray S. Mazer, Scott Meeks, and Jim Miller, Application-Specific Proxy Server as HTTP Stream Transducers, WWW4 Conferences, (Dec. 1995) pp. 1-9.
"Wormhole Caching with HTTP PUSH Method for a Satellite-Based Web Content Multicast and Replication System", Hua Chen et al., AT&T, Systems, Mar. 1999, pp. 1-12, XP002201410.
European Search Report—EP Application 12833975.1—dated May 4, 2015.

\* cited by examiner

SYSTEM AND METHOD FOR ACCELERATION OF A SECURE TRANSMISSION OVER SATELLITE

CROSS REFERENCE TO RELATED APPLICATIONS

The present application is a divisional application of and claims priority to U.S. patent application Ser. No. 13/596,509 filed on Aug. 28, 2012 and entitled "System and Method For Acceleration of a Secure Transmission Over Satellite," which is a continuation of U.S. patent application Ser. No. 10/303,722 filed on Nov. 26, 2002 and entitled "System and Method For Acceleration of a Secure Transmission Over Satellite," which is a continuation-in-part of U.S. patent application Ser. No. 09/781,554 filed Feb. 13, 2001 and entitled "System and Method For Internet Page Acceleration Including Multicast Transmissions," which claims priority from U.S. Provisional Patent Application No. 60/262,647 filed on Jan. 22, 2001 and entitled "Real-Time HTML Multicast System" and U.S. Provisional Patent Application No. 60/182,537 filed Feb. 15, 2000 and entitled "System and Method For Internet Page Acceleration Including Multicast Transmission," each of which is incorporated by reference herein.

FIELD OF THE INVENTION

The present invention relates to broadband communication systems. More particularly, the present invention relates to a communications system that communicates between a central telecommunications network and at least one remote station using a satellite communication link.

BACKGROUND

Various data caching systems are well known in the art for storing the contents of Internet pages, Web or data pages, in a cache memory for local display by a Web browser. For example, previously when the World Wide Web (WWW) was accessed primarily through a relatively slow dial-up link, a Web browser would often include a list of favorite Web sites. The entire contents of each Web site in the list would be downloaded overnight and continuously updated so that the experience associated with accessing a Web site contained in the list would be improved.

Some browsers include the ability to parse the contents of a Web page so that referenced objects, such as links to other Web pages, can be pre-fetched and stored in cache, thereby facilitating quick access to the linked Web pages.

Currently, there are many cache systems for the Internet. Some cache systems are located at a server, some are located at a client, and still others are distributed throughout the computer networks forming the Internet, such as being distributed between an Internet Service Provider (ISP), a hub and/or a central server location. See, for example, U.S. Pat. No. 5,727,129 to Barrett et al., U.S. Pat. No. 5,761,683 to Logan et al., and WO 99/16201 invented by K. L. El-Rafie. Additionally, companies such as Cidera (SkyPrefetch), StarBurst, Cisco, and Teleglobe provide distributed caching systems.

More recently, communications between distributed cache engines have been standardized in accordance with ICP (Internet Cache Protocol) RFC 2186. Consequently, in many of the distributed cache systems, a proxy server configuration is utilized in which a user selects a particular cache server a proxy server. Thereafter, all requests from the user are sent to the cache server for processing. Thus, by simply adjusting the default settings on the Web browser, the user is able to redirect all requests to a selected cache server.

Nevertheless, none of the aforementioned caching systems addresses problems that are associated with an asymmetric communication channel, such as a satellite network channel or a cable television channel. For example, a message and its corresponding reply in an asymmetrical channel often experience an excessive delay. In a satellite-based system, the delay is caused by the relatively long distances associated with the communication path. In a cable network or for a remote Internet access site, the delay is often caused by the number of users occupying the system.

To address performance problems in asymmetric systems having excessive delays, systems have been proposed that parse a referencing page at a headend, or a hub, site of the system. The system then immediately downloads related links and/or objects identified by parsing and/or based on the prior user selections to a remote terminal requesting the page referencing the related links and/or objects. The downloading function is automatic for these known systems and typically occurs without receiving additional requests from a requesting terminal. See, for example, U.S. Pat. No. 5,929,850 to Broadwin et al., and WO 99/08429 invented by B. L. Carneal et al. Such automatic downloading caching systems, however, can be problematic in that the downstream bandwidth is not efficiently utilized. Unneeded data is often automatically sent to a remote terminal without being based on a specific request from the remote terminal, and when, in fact, the remote terminal requires no further data. Such automatic downloading systems also often require one or more proxy servers. The use of automatic downloading and proxy servers reduces efficiency and increases latency based on overhead requirements that are associated with each proxy server.

What is needed is a technique for reducing the latency experienced at a remotely located station when requesting web pages and objects from a communications network, such as the Internet.

Moreover, transmission of information by establishing a Transmission Control Protocol/Internet Protocol (TCP/IP) connection over a satellite has emphasized the latency problems associated with the use of such incompatible transmission techniques. To overcome those delays, Gilat has commercially sold devices utilizing embedded TCP acceleration since at least as early as 1994, embedded within the modem. Such page acceleration techniques have concentrated primarily on TCP/IP page acceleration. To date, such systems have been unable to achieve satisfactory delays using a secure protocol layer running above a Transmission Control Protocol/Internet Protocol layer. For example, with regard to transmissions utilizing a Secure Sockets Layer (SSL), delays are dramatically increased because the SSL protocol generates a great deal of traffic including full handshakes, resumed handshakes, key exchanges, and a host of other signals.

SSL, for example, is a commonly deployed security protocol for providing a secure connection between two devices communicating over the Internet. Critical to this technique is the use of identifiers for identifying the authorized participants of the secure communication such that intermediate devices simply pass data to one of the two devices unchanged, and without deciphering the encrypted data. The Secure Sockets Layer runs above the TCP/IP layer. SSL is designed to allow any protocol that is designed to run over TCP/IP to also run over the SSL. The handshaking protocol typically includes numerous steps be performed for exchanging indications of the SSL version to be used, cipher settings, keys for generating a premaster secret, for example, and many more.

Thus, where TCP/IP acceleration may be employed to reduce latency associated with standard web browsing over a satellite communication system, a problem arises where the transfers between the web browser and the web host or server are encrypted. First, given the numerous signal exchanges required by the SSL protocol for establishing a secure connection and the inherent delays associated with transmission of Internet communications over a satellite communication system, establishing an SSL connection over a satellite introduces considerable latency. Such communications become prohibitively slow, rendering use of secure communications over satellite systems undesirable. Second, in HTTPS, the connection between the client browser and the web server is encrypted such that it may not be possible to interpret the pages or to pre-fetch the pages at the hub server. The handshake protocol component of SSL, for example, includes steps for authenticating the identity of each respective device through the exchange of SSL Certificates that have been "signed" by a Certificate Authority or other company the browser/computer trusts, and through the exchange of encryption keys. For example, SSL uses X509 certificates. These security measures may prevent acceleration of secure Internet communications using standard TCP/IP acceleration. Accordingly, a new protocol is required for transmitting secure communications over a satellite where the link is encrypted using HTTPS, SSL, or other secure web based protocols.

There is a need, therefore, for a technique for reducing the latency experienced at a remotely located station when requesting secure Internet communications between the remote station and web hosts through a satellite communications system.

SUMMARY

Aspects of the present invention provides a technique for reducing the latency experienced at a remotely located station when requesting web pages and objects from a communications network, such as the Internet.

The advantages of the present invention are provided by a caching system and method for a satellite communications system in which a remote client station, such as a VSAT-based client station, requests a selected data page from a host station, such as a server, that is connected to a communications network, such as the Internet. According to the invention, the remote client station is coupled to the communications network through the satellite communications system. The requested data page can be a home page and/or a favorite page for the remote client station. A cache storing information forming at least a portion of at least one data page receives the request for the selected data page and determines whether at least a portion of information forming the selected data page is stored in the cache. When information forming the selected page is stored in the cache, the cache sends the information forming the selected page that is stored in the cache to the remote client station. The cache also sends a request to the host station through the satellite communications system for information forming the selected data page that is not stored in the cache. Accordingly, the cache can receive periodic updates of the information forming the base page from a server hosting the base page through, for example, a multicast transmission or through a tunnel.

In an aspect of the present invention, the cache parses the base page and identifies objects, such as an in-line object or a dynamically-embedded object, contained in the base page. The cache then sends at least one identified object contained in the base page and that is stored in the cache to the remote client station when the at least one identified object contained the base page is stored in the cache. Subsequently, the cache sends a request to the host station through the satellite communications system for each identified object contained in the base page that is not stored in the cache. When the remote client station receives the base page and the at least one identified object from the cache, the remote client station displays the information forming the base page and the at least one identified object without delay. Alternatively, the remote client station displays the information forming the base page for a predetermined period of time before displaying the at least one identified object contained in the base page. As yet a further alternative, the cache can send the at least one identified object to the remote client station after a predetermined period of time elapses after the base page is sent to the remote client station.

As an even further alternative, the cache can include a linked list of objects stored in the cache, in which case the cache sends at least one identified object contained in the base page and that is included in the linked list of objects to the remote client station when the at least one identified object contained the linked list of objects is stored in the cache. The cache then sends a request to the host station through the satellite communications system for each identified object contained in the linked list of objects that is not stored in the cache. The cache can also send the linked list of objects to the remote client station so that the remote client station can synchronize a list of objects stored at the remote client station with the received linked list of objects stored in the cache. The cache can receive a list of objects stored at the remote client station from the remote client station so that the cache can synchronize the linked list of objects stored in the cache with the received list of objects stored at the remote client station. Additionally or in the alternative, the cache can receive information from the remote client station relating to an object handling capability of a browser operating in the remote client station. The cache can then determine which objects contained in the requested base page to send to the remote client station based on the received information relating to the object handling capability of the browser.

According to one aspect of the invention, the cache pre-fetches the requested data page and at least one object contained in the requested data page before the request for the data page is received from the remote client station. The cache can then form a data cluster from at least one object contained in the requested data page, and sends the data cluster to the remote client station. Alternatively, the cache multiplexes a plurality of objects contained in the requested data page, and/or compresses the data cluster before sending the data cluster to the remote client station.

Where the data page includes information forming a base page, the cache may send the base page to the remote client station when information forming the base page is stored in the cache and subsequently send a request to the host station through the satellite communications system for information forming the base page that is not stored in the cache. Where the remote client station stores information forming the requested data page, the cache may send information to the remote client station indicating that the requested data page stored in the remote client station does not need to be updated when information stored in the cache forming the requested data page is up to date.

The remote client station may be co-located with the cache, and/or coupled to the cache through a satellite communication link. For example, the cache may have a first portion and a second portion such that the remote client station is co-located with the first portion of the cache and is coupled to the second portion of the cache through a satellite communication link. In one embodiment of the present invention, the second portion of the cache can be connected to the communications network. In another embodiment of the present invention, the cache includes a third portion that is coupled to the communications network, and the second portion of the cache is coupled to the third portion of the cache through another satellite communication link.

An embodiment of the present invention also provides multicast system that has a server content evaluator and a server content cache. The server content evaluator is connected to a computer network, such as the Internet, that contains a plurality of stored pages of information each having a predetermined format, such as HTML. The server content evaluator determines whether a particular page is capable of being multicast to a plurality of client applications and assigns a unique index number to each page determined to be capable of being multicast to a plurality of client applications. The server content cache is coupled to the server content evaluator and stores index numbers that are assigned to pages of information that have been determined to be capable of being multicast to a plurality of client applications. The server content evaluator receives a request from a client application for a selected page of information over, for example, a satellite communication link, and sends the index number for the selected page to the client application when the selected page has an assigned index number stored in the server content cache. Accordingly, the server content evaluator receives the selected page of information from the computer network when the selected page of information does not have an assigned index number, determines whether the selected page is capable of being multicast to a plurality of client applications, and assigns a unique index number to the selected page when the selected page is determined to be capable of being multicast to a plurality of client applications. The server content evaluator then sends the assigned index number for the selected page to the client application.

The multicast system also includes a server multicast engine that is coupled to the server content evaluator. The server multicast engine sends the selected page of information to the client application when the server content evaluator determines that the selected page of information does not have an assigned index number, receives the selected page of information from the computer network and then assigns the unique index number to the selected page.

An aspect of the invention a client content synchronizer that receives the request from the client application for the selected page of information, may send the request for the selected page of information to the server content evaluator. Subsequently, the client content synchronizer receives the index number assigned to selected page of information from the server evaluator. A client content cache coupled to the client content synchronizer stores pages of information, such that each page of information has an assigned index number. The client content synchronizer sends the received index number for the selected page of information to the client content cache and receives the selected page of information corresponding to the received index number. The client content synchronizer then sends the selected page of information to the client application. A client multicast engine is coupled to the client multicast cache that receives the selected page of information from a server multicast engine when the selected page of information is not stored in the client content cache.

Further aspects of the invention address the need for reducing the latency experienced at a remotely located station when requesting web pages and the like and exchanging confidential information using secure transmissions between a web server and an Internet computer including a browser, over satellite communications systems. Aspects of the present invention address this need through a system and method for performing secure protocol acceleration. One aspect of the present invention primarily relates to the encryption of data above the transport level and may include encryption of the data at the application layer. Another aspect of the invention involves certificate handling and may further involve a technique for generating security certificates.

In accordance with aspects of the invention, secure protocol acceleration is employed such that the required protocol signals transmitted from a computer using a web browser may be intercepted by a remote terminal. To insure that the browser will continue transmitting data, the remote terminal may generate required acknowledgment signals and security signals necessary to continue the secure communication. Such signals may then be transmitted to the browser. Meanwhile, the intercepted protocol signals may be converted for transmission through the satellite communications system in a format appropriate for that communication medium. Further aspects of the invention involve forwarding signals and data from the browser and the associated computer, through the satellite communications system, to the web server, and an exchange of information from the web host to the computer in a reverse manner.

Aspects of the invention further may include a hub or similar device communicating with the satellite communications system. A secure connection between that device and the web server may be maintained by simulating a continuous secure connection between the computer and the web server. By transmitting required acknowledgment signals, and dynamically generating security signals, components of the system may maintain the flow of data transmitted from the devices participating in a secure communication while the data is in fact transmitted over a secure satellite link in a format conducive to such transmissions.

Further aspects of the invention relate to distributed certificate sharing which may involve generation of multiple certificates for establishing secure links or secure sublinks between the components employed in the communication system. A further aspect of the invention involves manual and/or automatic addition of certificate authority within the secure network, as optionally may be chosen by the user of such a system.

BRIEF DESCRIPTION OF THE DRAWINGS

The present invention is illustrated by way of example and not limitation in the accompanying figures in which like reference numerals indicate similar elements and in which.

DETAILED DESCRIPTION

Figure 1A:
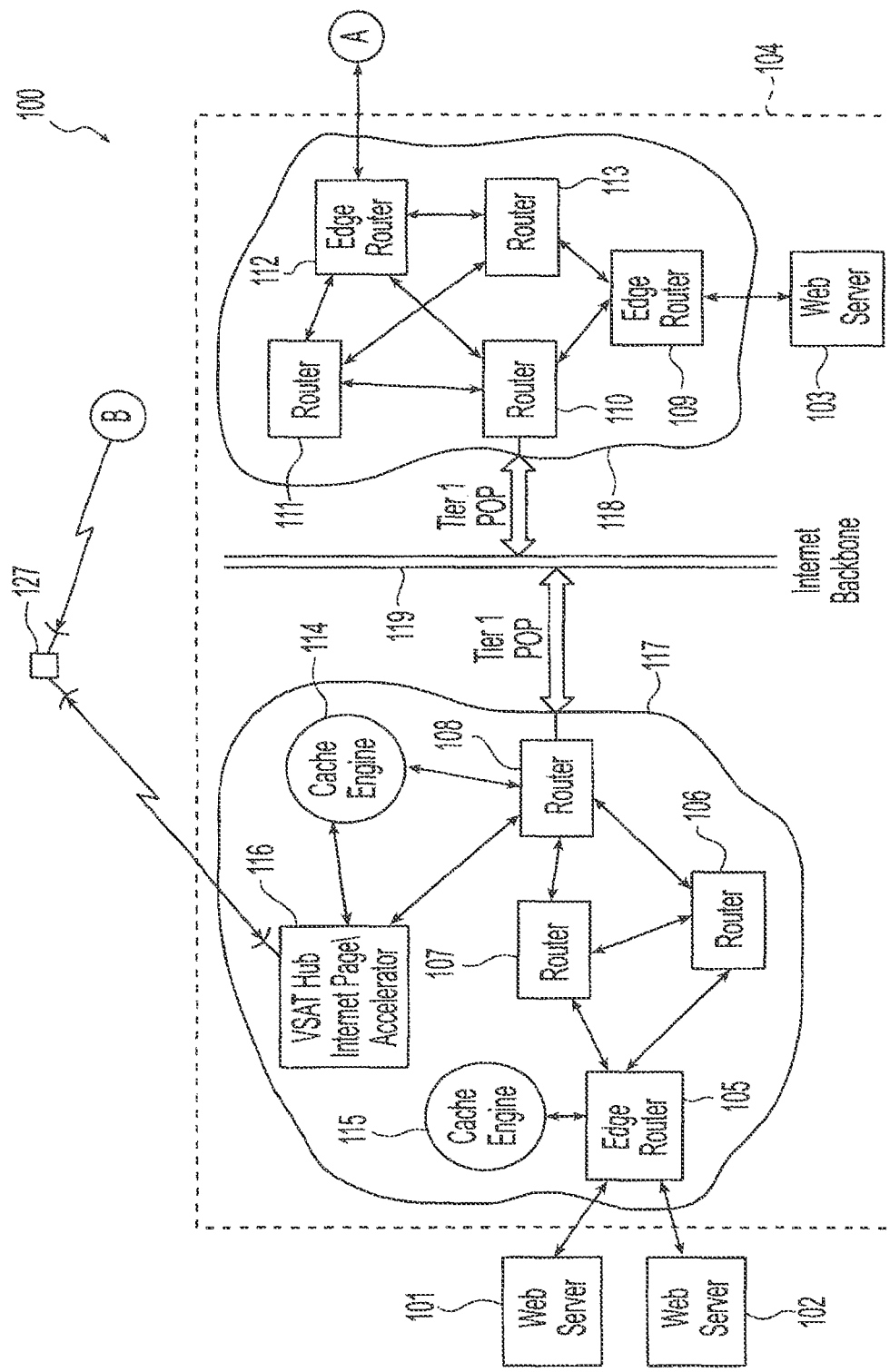
FIGS. 1A and 1B are schematic block diagrams of a broadband communications network incorporating the present invention.
Figure 1B:
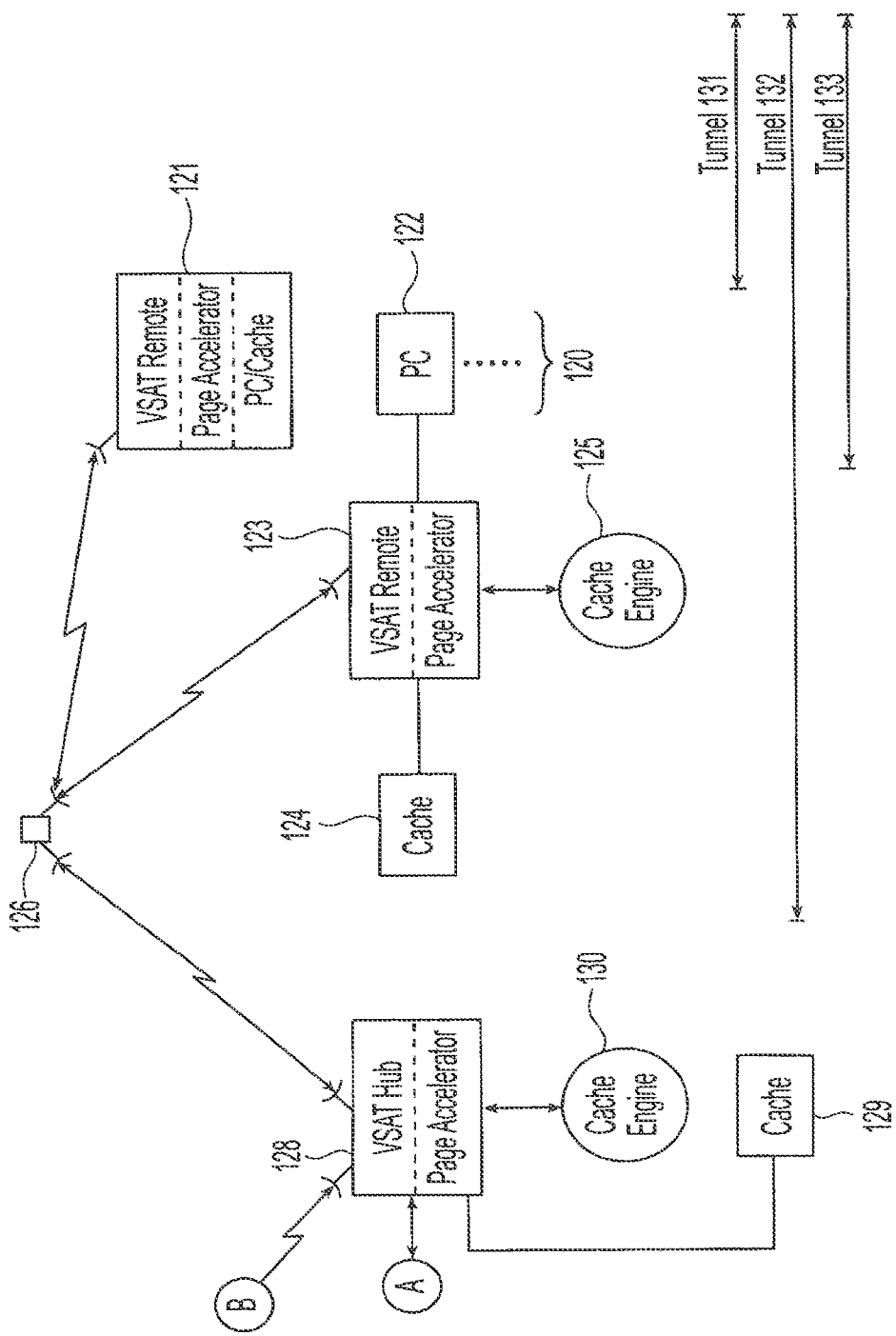

FIGS. 1A and 1B show schematic block diagrams of broadband communications network 100 in which the present invention can be utilized. Broadband communications network 100 includes a plurality of Web servers 101, 102 and 103 that are coupled together via a telecommunications or computer network 104, such as the Internet (Web). Web servers 101, 102 and 103 operate in a well-known manner as host devices that store information, such as Web or data pages.

Telecommunications network 104, when embodied as the Internet, can include a plurality of routers 105-113, a plurality of cache engines 114 and 115, and one or more Very Small Aperture Terminal (VSAT) hubs 116. Routers 105-113 can be clustered in a plurality of sub-networks 117 and 118 that are interconnected via an Internet Backbone 119. Sub-networks that are connected directly to Internet backbone 119 are commonly referred to as Tier 1 point-of-presence (POP) networks. While only servers 101-103, routers 105-113, cache engines 114 and 115, VSAT hub 116 and sub-networks 117 and 118 are shown in FIGS. 1A and 1B as part of communications network 100, it should be understood that more or fewer of each component can be part of communications network 100.

Telecommunications network 104 is interconnected to a plurality of remotely-located stations, or terminals, 120, such as a VSAT-enabled personal computer (PC-VSAT) 121 and/or a PC 122 that is coupled to telecommunications network 104 through one or more remote VSAT stations 123. Remote VSAT station 123 can include an integral cache 124 and/or a cache engine 125 containing a cache. Remote stations 120 can be coupled to Web servers 101-103 through one or more satellites 126 and 127, and one or more VSAT hubs 128. VSAT hub 128 can include an integral cache 129 and/or cache engine 130 containing a cache. While only remote stations 121 and 122, satellites 126 and 127, and VSAT hub 128 are shown in FIGS. 1A and 1B as part of communications network 100, it should be understood that more or fewer of each component can be part of communications network 100.

In operation, requests for specific data are made by remote stations 120 and sent to various Web servers throughout telecommunications network 104. Typically, the "round trip" latency between the time that a request is made (i.e., sent) and the time that a reply to the request is perceived by a user is a minimum of 500 ms, plus any time delay experienced for both the request and reply to traverse telecommunications network 104 (i.e., the Internet). In reality, the delays in traversing Internet 104 can be substantial, particularly through the middle portion of Internet backbone 119, which carries the majority of the Internet traffic. The latency experienced at a remotely-located station 120 is particularly acute. Moreover, the latency is compounded because a typical web page can contain, for example, 10 to 80 objects that each may be retrieved. Accordingly, each object is sequentially requested across the satellite link (i.e., through satellite 126), thereby leading to a significant delay as each object is retrieved. Even when multiple connections (e.g., two to four) are opened, the latency between request and reply can still be uncomfortably long for a user.

The present invention balances speed requirements for reduced latency with network efficiency, thereby achieving a pleasant user experience without filling the capacity of a satellite downlink channel with unnecessary data. For example, when a new web page is requested by a remote station 120, the present invention queries a local cache storage for the base page of the requested web page. Such a local cache storage can be contained with the requesting remote station and/or a cache 124 and/or 125 located in remote VSAT station 123. In situations when the requested base page has been stored in a local cache, the base page can be immediately retrieved for the remote station. Accordingly, the local cache storage can be automatically periodically updated by, for example, cache engine 129 using any suitable protocol, such as Internet Cache Protocol (ICP). The ICP can be modified so that data is received from VSAT-coupled cache servers, such as cache engine 129, is compatible with the IP multicast protocol. The ICP can also be modified for allowing remote stations 120 and/or VSAT hub 128 to specify home pages and/or favorite pages. The base page can also be extracted directly from the home page location within a browser located on a remote station 120. Favorite pages can also be identified based on a statistical determination of accessed pages, or on a frequency that a page is accessed.

According to one aspect of the invention, when a base page is located in cache storage in a remote station 120, the cached page is parsed for identifying any in-line objects contained in the page. Alternatively, a local cache storage can also contain a linked list of in-line objects that are associated with particular base pages and that are also stored in the local cache. When a requested page is determined not to have objects contained in the linked list, the base page of the requested page is parsed for generating a list of objects that are referenced within the base page. Thereafter, the local cache in a remote station 120 can be checked for determining whether the in-line objects are present. When the local objects are also present, the base page can continue loading normally.

In situations when a base page is present in a cache locally at a remote station 120, but the objects within the base page are not, the remote station sends a modified GET message to VSAT hub 128 indicating which particular page is being accessed by the remote station. Cache engine 129 at VSAT hub 128 then pre-loads objects associated with the requested base page by parsing the base page for identifying any objects associated with the base page, and issues a request for the associated objects. Rather than sending all objects or parts of the objects to the remote station as the objects are received at VSAT hub 128, VSAT hub 128 can optionally be configured to compile the received objects into a multiplexed data cluster that can, in turn, be compressed. After the remote station has loaded all or part of the base page, the remote station sends a GET request to VSAT hub 128 for requesting the multiplexed data cluster of objects. VSAT hub 128 then sends the multiplexed data cluster to the remote station where the compressed data cluster is decompressed and/or demultiplexed into the individual objects for use by the base page.

Loading of all or part of a base page prior to requesting the objects associated with the base page has the advantage that a user is allowed to halt the request before large amounts of data objects associated with the base page are transmitted over, for example, satellite 126. According to one aspect of the present invention, portions of the text of a base page can be displayed for a fraction of a second before the objects associated with the base page are automatically requested, thereby allowing high-speed browsing without filling the satellite link with large objects, such as picture, video, and/or audio files, that are associated with the base page. Another aspect of the present invention provides that index markers from VSAT hub 128 to a remote station that indicate to the local cache storage of the remote station that contents stored in the local cache are indeed up-to-date and no new data is required to be downloaded.

When one or more Web pages and/or associated objects, such as Microsoft™, Yahoo™ and/or Netscape™ home pages, are frequently requested by a plurality of terminal stations, the present invention updates caches associated with a plurality of terminal devices using, for example, multicast protocols that allow for efficient transmission of cache data over a satellite network. Details of a multicast transmission system in accordance with the present invention will be described below.

When a local cache in a remote station 120 does not include a requested page and the objects associated with the requested page, normally a request is then made to Internet 104 for retrieving the necessary data. A request for a domain name server (DNS) look-up can be made from a remote station 120 to VSAT hub 128. According to the invention, VSAT hub 128 can optionally store a version of the DNS tables in cache engine 129 to immediately return the IP address for the desired web server to the requesting remote station 120. When a locally stored DNS table is available at VSAT hub 128, an immediate look-up is executed. When a DNS table is located remotely from VSAT hub 128, VSAT hub 128 requests the IP address of the desired Web server from the remotely located DNS (FIGS. 1A and 1B) in a well-known manner. In either event, VSAT hub 128 initiates the request for the desired web page directly to the retrieved IP address for obtaining and returning the base page to the requesting remote station. Thus, the delay of transmitting the IP address across the satellite from the remote station and receiving the request back is substantially reduced.

For example, VSAT hub 128 retrieves a desired base page from a Web server, such as Web server 10. The base page is then transmitted directly to the requesting remote station 120, while being processed by VSAT hub 128. That is, the received base page is parsed at VSAT hub 128 and/or compiled for identifying any objects associated with the base page. Identified objects are subsequently requested directly by VSAT hub 128, thereby avoiding any delays associated with satellite link 126. VSAT hub 128 then assembles the objects for transmission to remote station 120. Meanwhile, at the remote station 120, the base page is partially and/or completely loaded. Optionally, portions of the text of a base page can be displayed for a fraction of a second before the objects associated with the base page are automatically requested, as described above. When the downloading of the page is not aborted, a request is made to VSAT hub 128 to return a multiplexed data cluster of objects assembled at VSAT hub 128. In this manner, the satellite link between remote station 120 and VSAT hub 128 is not congested with numerous large objects that are often not wanted by a user. Alternatively, aborting the downloading of a page can generate a special user request that is forwarded to VSAT hub 128 so that the objects associated with the aborted page are prevented from being forwarded to remote station 120, thereby preventing link congestion.

Alternatively, in situations when it is difficult or inconvenient to determine when a user has actually viewed all or a portion of the base page, the present invention waits a predetermined period of time, such as 300 ms, before a remote station 120 automatically requests the objects associated with a requested page from VSAT hub 128.

When VSAT hub 128 parses a base page, VSAT hub 128 can communicate to and/or receive from remote station 120 a list of all objects requested. Consequently, when the objects are different, VSAT hub 128 can request any additional objects or discard any objects that are not likely to be utilized. For example, the Web browser on a remote station 120 can be configured with additional software for a new type of Java language or file format. Consequently, the Web browser on the remote station can require more objects than anticipated by VSAT hub 128. Alternatively, a remote station 120 can include outdated software that cannot process as many objects that have been automatically requested by VSAT hub 128. In either situation, it is often desirable for VSAT hub 128 and remote station 120 to synchronize their object requests prior to utilizing the downlink bandwidth of the satellite filling requests for objects. This is equally applicable when some, but not all, of the objects are available in a local cache at a remote station 120. Accordingly, it can be desirable for VSAT hub 128 to wait until a specific request for objects (i.e., in the form of an object list) is received from remote station 120 before forwarding objects to remote station 120.

Conventional cache engines only parse the base page looking for in-line objects, such as data files and other page links. This type of parsing, however, is not efficient for current Web pages, which can contain relatively sophisticated objects, such as dynamically-embedded objects. Accordingly, it is often necessary to compile the Web page for determining the presence of more sophisticated objects. For example, the present invention can include a Java compiler that is associated with base page parsing and/or a cache for identifying dynamically-embedded objects, thereby providing significant speed enhancements over conventional cache engines. Additionally and/or alternatively, the present invention can parse other types of dynamic web pages, such as Excel™ files, for identifying dynamic objects contained therein.

Alternatively, a hub-based caching mechanism of the present invention can use the Web response for identifying the cache contents. (In contrast, conventional techniques for identifying objects associated with a requested base page are based on a Web request.) The alternative approach of parsing a Web response increases the probability of a cache "hit" at the hub cache engine, as well as at the remote cache engine. Although additional traffic is generated between VSAT hub 128 and Internet web servers by this alternative approach, the data transmitted from VSAT hub 128 to a remote station 120 can be significantly reduced, thereby increasing the efficiency of the satellite link.

Yet another aspect of the invention utilizes tunneling between various locations within communications network 100 to further reduce latency associated with multiple open connections. Tunneling allows a process running at a remote station 120 to communicate directly with a process located remotely from remote station 120, such as to a process on the other side of a satellite link. For example, as shown in FIGS. 1A and 1B, a tunnel 131 can be formed between a remote station 120 and a VSAT hub 128. Similarly, a tunnel 132 can be formed between a remote station 120 and one or more web servers, such as server 102, located anywhere within telecommunications network (Internet) 104. Further, a tunnel 133 can be formed between a remote station 120 and/or one or more servers, such as server 103, within a selected sub-network, such as sub-network 118, that form a point of presence (POP) with telecommunications network (Internet) 104. Tunnel 133 provides the advantage of avoiding latency associated with the most congested part of the Internet, such as the Internet backbone 43. Tunneling also allows encrypting in a well-known manner for transferring sensitive data over the entire path of the tunnel. Moreover, the tunneling aspect of the invention can be used in a communication network that does not utilize a satellite link.

Various Web servers, routers, cache engines, and hubs can be configured to contain a page accelerator process that parses a base page request from a remote station 120 and assembles a multiplexed data cluster of objects for the requested base page. For example, a page accelerator process can be located within VSAT hub 116. Objects associated with a requested base page that are forwarded to VSAT hub 116, assembled and distributed to the requesting remote station 120. The transmission across the satellite link can be via multicasting, thereby reducing latency based on establishing a connection. Page acceleration, according to the present invention, is particularly effective when the system multiplexes multiple objects into clusters and forwards the clusters in bulk.

When a favorite page or home page update is implemented, the home page or favorite page can be updated on a periodic basis. Alternatively, a local cache engine associated with the home or favorite page can be queries for determining whether the page has been updated. Any update can be replicated to any cache; such as cache 129 associated with VSAT hub 128 and/or any cache associated with remote stations 120, such as cache 124.

Alternatively, the present invention provides that a persistent lower layer protocol connection can be formed between applications so that there is no need to open and close connections associated with each object, thereby reducing latency. This aspect of the present invention is particularly useful across a satellite link or in areas experiencing long delay, such as across Internet backbone 119 to remote network sites.

Additionally, latency can be further reduced by utilizing eliminating the need to send acknowledgements across satellites 126 and/or 127. For example, a TCP acceleration mechanism can be utilized for allowing local closing of connections by locally providing finish and acknowledge communication commands, thus substantially reducing latency time associated with TCP acknowledgements and eliminating the need for synchronizing or acknowledging connections across the satellite link.

When objects are parsed that are associated with multiple Web servers, a further enhancement for reducing latency is to assemble the object requests into separate lists associated with each Web server and then to forward the requests separately. This is particularly useful when Web bypass links, such as through satellite 127, are utilized for speeding the process of accessing remote portions of communications network 100.

A VSAT hub, such as VSAT hubs 116 and 128, can also store cookies that are associated with the respective servers accessed by a remote station 120 so that there is no requirement for the remote station 120 to send a lengthy cookie with a "GET" request for a new web address. Further, such a VSAT hub that stores cookies for a remote station has the information contained in the cookie that can be used when parsing and/or compiling a requested base page.

As yet a further enhancement of the present invention, a list of objects associated with a requested base page can be determined at a location that is "remote" from a remote station 120, such as remote VSAT hub 116. Alternatively, a VSAT hub, such as VSAT hub 128, can determine the list of objects associated with a requested base page and forward the list to another VSAT hub, such as VSAT hub 117. VSAT hub 117 then contacts the appropriate Web server (i.e., Web server 101) and requests all objects contained in the list. VSAT hub 117 then assembles a multiplexed data cluster of objects received from the Web server at a relatively high rate of speed with a corresponding reduced latency because of the proximity of VSAT hub 117 to Web server 101. The multiplexed data cluster generated by VSAT hub 117 (compressed or uncompressed) is then be forwarded via satellite 127 back to VSAT hub 128, thereby eliminating delays associated with Internet backbone 119.

As previously noted, the various embodiments of the present invention can include a multicast transmission system for transmitting the same data to multiple clients simultaneously. Such a multicast system is useful for transmitting information that is frequently accessed by remote stations 120, such as the Microsoft™, Yahoo™ and Netscape™ home pages. The multicast transmission system can also be used, for example, for transmitting "non-optional" advertisement handlings and for integrating customized training information with other available external content.

Figure 2:
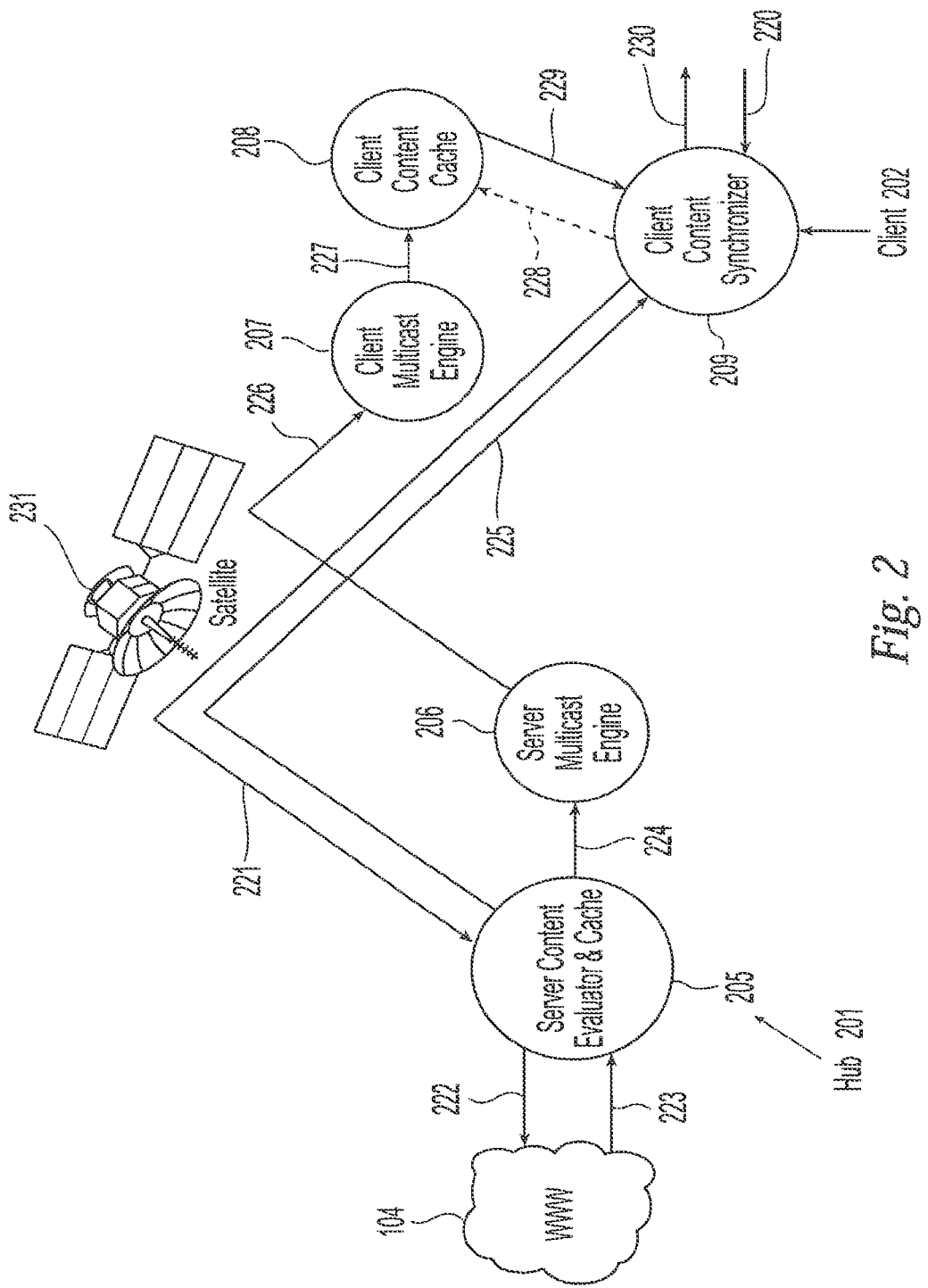
FIG. 2 is a schematic block diagram of a portion of the broadband communications network shown in FIGS. 1A and 1B that provides a satellite-based real-time HTML multicast system according to the present invention.

FIG. 2 is a schematic block diagram of a portion of broadband communications network 100 (FIGS. 1A and 1B) that provides a satellite-based real-time HTML multicast system 200 according to the present invention. For simplicity, FIG. 2 shows only the functional blocks of the multicast transmission system of the present invention. System 200 includes a hub or server node 201 and a plurality of client nodes 202, although only a single client node 202 is shown in FIG. 2. Hub node 201 is connected to telecommunications network 104 (FIGS. 1A and 1B), such as the Internet (WWW). Alternatively, telecommunications network 104 can also be a local area network (LAN) or a wide area network (WAN) that, in turn, is connected to the Internet. Telecommunications network 104 includes information that is preferably stored in the form of hypertext mark-up language (HTML) pages. Hub node 201 is communicatively coupled to each client node 202 over a satellite communication link utilizing a satellite 231 of a satellite network in a well-known manner.

In one embodiment of the multicast system of the present invention, hub node 201 corresponds to, for example, VSAT hub 117, and client node 202 corresponds to, for example, VSAT hub 128. In another embodiment of the multicast system of the present invention, hub node 201 corresponds to, for example, VSAT hub 117, and client node 202 corresponds to, for example, remote VSAT station 123. In yet another embodiment of the multicast system of the present invention, hub node 201 corresponds to, for example, VSAT hub 117, and client node 202 corresponds to, for example, remote VSAT station 121. Of course, while only a single satellite 231 is shown in FIG. 2, it should be understood that system 200 could include a plurality of satellites forming the satellite network. Moreover, it should be understood that system 200 could include a plurality of hub nodes 201 connected to one or more telecommunications networks 104. Further, system 200 can include a plurality of client hubs 202.

Hub node 201 includes a Server Content Evaluator and Cache 205 (i.e., cache 114 in FIGS. 1A and 1B), and a Multicast Engine 206. Server Content Evaluator and Cache 205 is connected to telecommunications network 104 to operatively receive and send communications messages from/to telecommunications network 104 in a well-known manner. Server Multicast Engine 206 is connected to Server Content Evaluator and Cache 205.

Client node 202 includes a Client Multicast Engine 207, a Client Content Cache 208 (i.e., cache 124 in FIGS. 1A and 1B) and a Client Content Synchronizer 209. Client Multicast Engine 207 is communicatively coupled in a well-known manner to Server Multicast Engine 206 through satellite 231. Additionally, Client Multicast Engine 207 is coupled to Client Content Cache 208. Client Content Synchronizer 209 is communicatively coupled in a well-known manner to Server Content Evaluator and Cache 205 through satellite 231. Client Content Synchronizer 209 is also coupled to Client Content Cache 208, and to at least one client application that is executing at, for example, a remote station 120 (FIGS. 1A and 1B).

At hub node 202, Server Content Evaluator and Cache 205 evaluates the contents of unique HTML pages on a real-time basis and marks those particular pages that are capable of being multicast to multiple clients. The same information content can be usually accessed using multiple HTTP path names, which are also known as URLs. Server Content Evaluator and Cache 205 also uniquely identifies each of page having unique content and that is capable of being multicast using an index number for synchronizing communication between itself and client applications. A plurality of the unique base pages and unique objects associated with the base pages are stored in the cache portion of Server Content Evaluator and Cache 205.

Server Multicast Engine 206 is responsible for multicasting any data together with the corresponding index numbers identifying the data to the clients. Server Multicast Engine 206 is capable of sending the data contents in either a simplex (i.e., no acknowledgment from a client) or a duplex mode (i.e., negative acknowledgments from a client).

Client Multicast Engine 207 receives multicast data and forwards received data to Client Content Cache 208. Client Content Cache 208 stores the unique HTML contents of selected pages of information along with the corresponding assigned index numbers for the selected pages.

Client Content Synchronizer 209 evaluates requests received from a client application 210, such as a browser located at a remote station 120, communicates with Server Content Evaluator and Cache 205, and derives a specific multicast item that is to be forwarded to client application 210. In the situation that a requested data item, i.e., base page or object, does not exist in Client Content Cache 208, Server Content Evaluator and Cache 205 obtains the requested data item from telecommunications network 104. Through a multicast mechanism, preferably through satellite 231, Server Content Evaluator and Cache 205 forwards the requested data item to Client Content Cache 208. Client Content Synchronizer 209 also multiplexes multiple client requests and compresses the requests before forwarding to the Server side 201 of the system, thereby providing inbound bandwidth efficiency.

Data flow for the present invention is as follows: A request for a selected data item, such as an HTML page, is received at 220 in FIG. 2 by Client Content Synchronizer 209 from a client application located within a remote station 120. At 221, Client Content Synchronizer 209 forwards the request for the data item (in a modified form, if appropriate) to Server Content Evaluator and Cache 205 through satellite 231. When Client Content Synchronizer 209 has received multiple requests for HTML data, a received request is preferably multiplexed and compressed with other requests received by Client Content Synchronizer 209, thereby providing inbound bandwidth efficiency at Server Content Evaluator and Cache 205. Server Content Evaluator and Cache 205 examines the content data stored in cache for the requested data item. A multiplexer portion of Client Content Synchronizer 209 schedules satellite inbound responses to the requests, thereby synchronizing bandwidth utilization.

When the requested data item is not stored in cache at hub node 201, Server Content Evaluator and Cache 205 requests the information from telecommunications network 104 in a well-known manner at 222, such as using a standard HTML request. The requested data item is returned at 223, preferably in the form of a standard HTML response, either directly or redirected automatically from telecommunications network 104. At 224, Server Content Evaluator and Cache 205 identifies the received response using a unique index number, and forwards the received response to Server Multicast Engine 206. At 225, Server Content Evaluator and Cache 205 sends the index number corresponding to the requested data item. At 226, Server Multicast Engine 206 multicasts the requested data item and the corresponding index number for the requested data item to Client Multicast Engine 207. At 227, all multicast contents received by Client Multicast Engine 207 are forwarded to and saved by Client Content Cache 208. At 228, Client Content Synchronizer 209 requests the content of the requested data item from Client Content Cache 208 using the index identifier received from Server Content Evaluator and Cache 205. At 229, Client Content Cache 208 returns the content of the requested data item to Client Content Synchronizer 209. At 230, Client Content Synchronizer forwards the content of the requested data item to the requesting client application.

When the requested data item is found to be stored in cache at hub node 201, Server Content Evaluator and Cache 205 sends a message to Client Content Synchronizer 209 at 225 indicating the index number for the requested data item stored in Client Content Cache 208. At 228, Client Content Synchronizer 209 requests the content of the requested data item from Client Content Cache 208 using the index identifier received from Server Content Evaluator and Cache 205. At 229, Client Content Cache 208 returns the content of the requested data item to Client Content Synchronizer 209. At 230, Client Content Synchronizer forwards the content of the requested data item to the requesting client application.

Figure 3:
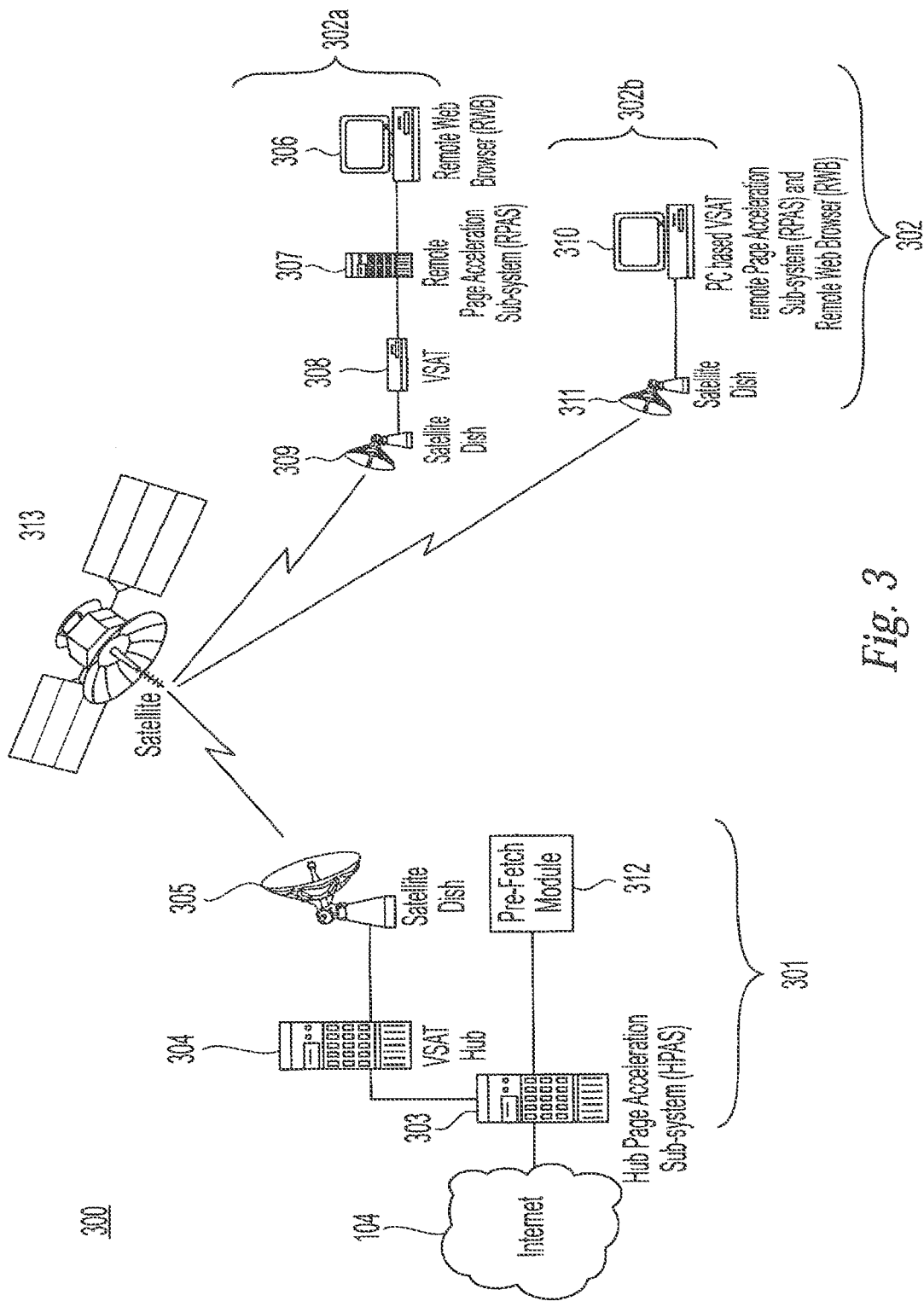
FIG. 3 is a schematic block diagram of a portion of the broadband communications network shown in FIGS. 1A and 1B that provides a page accelerating system according to the present invention.

FIG. 3 is a schematic block diagram of a portion of broadband communications network 100 (FIGS. 1A and 1B) that provides a page accelerating system 300 according to the present invention. For simplicity, FIG. 3 shows only the functional blocks of the page accelerating system of the present invention. Page accelerator system 300 includes a hub or server node portion 301 and at least one client node portion 302. Hub node portion 301 is connected to telecommunications network 104 (FIGS. 1A and 1B), again, such as the Internet (WWW). Alternatively, telecommunications network 104 can also be a local area network (LAN) or a wide area network (WAN) that, in turn, is connected to the Internet. Once again, telecommunications network 104 includes information that is preferably stored in the form of hypertext mark-up language (HTML) pages. Hub node portion 301 is communicatively coupled to each client node portion 302 over a satellite communication link utilizing a satellite 313 of a satellite network in a well-known manner.

In one embodiment of the page accelerator system of the present invention, hub node portion 301 is located at, for example, VSAT hub 117, and client node portion 302 is located at, for example, VSAT hub 128. In another embodiment of the accelerator system of the present invention, hub node portion 301 is located at, for example, VSAT hub 117, and client node portion 302 is located at, for example, remote VSAT station 123. In yet another embodiment of the page accelerator system multicast system of the present invention, hub node 201 corresponds to, for example, VSAT hub 117, and client node 202 corresponds to, for example, remote VSAT station 121. Of course, while only a single satellite 313 is shown in FIG. 3, it should be understood that system 300 could include a plurality of satellites forming the satellite network. Moreover, it should be understood that system 300 could include a plurality of hub node portions 301 connected to one or more telecommunications networks 104. Further, system 300 can include a plurality of client hub portions 302.

Hub node portion 301 includes a Hub Tunnel Agent 303 (also referred to herein as Hub Page Acceleration Subsystem (HPAS)), a VSAT Hub 304 and a central satellite dish antenna 305. Hub Tunnel Agent 303 is connected to telecommunications network 104 to operatively receive and send communications messages from/to telecommunications network 104 in a well-known manner. Hub Tunnel Agent 303 is connected to VSAT Hub 304, and VSAT hub 304, in turn, is connected to central satellite dish antenna 305.

According to one exemplary embodiment of the present invention, a client hub portion 302 includes a personal computer 306 (also referred to herein as a Remote Web Browser (RWB)), a Remote Tunnel Agent (RTA) 307 (also referred to herein as a Remote Page Acceleration Subsystem (RPAS)), a VSAT 308 and a remote satellite dish antenna 309. This exemplary embodiment corresponds to PC 122 and remote VSAT station 123 shown in FIGS. 1A and 1B. According to another exemplary embodiment of the present invention, a client hub portion 302 includes a PC-VSAT-RTA 310 having an integrated RTA and an RWB, and a remote satellite dish antenna 311. This second exemplary embodiment corresponds to PC-VSAT 121 shown in FIGS. 1A and 1B.

VSAT 308 and PC-VSAT-RTA 310 communicate with VSAT Hub 304 via remote satellite dish antennas 309 and 311, respectively, satellite 313, and central satellite dish antenna 305. VSAT Hub 305 connects to telecommunications network 104 (i.e., the Internet) via HTA 303, and allows a user to perform activities on the Internet, such as Internet browsing, using the hypertext transfer protocol (HTTP).

Page accelerator system 300 of the present invention provides two benefits. First, the requirement that a TCP connection be established over the satellite link between the client on a PC 306 (or a PC-VSAT-RTA 310), i.e., the user's remote web browser or RWB, and a desired web server within the Internet is eliminated. Second, page accelerator system 300 provides the necessary hardware for page accelerator software.

As previously described, before an RWB can send an HTTP GET request for a page, a connection between the RWB and the appropriate web server is established. When the web page contains objects from different web servers (as is very common for advertisements and for web server load distribution), at least one connection will be established to each different web server, each of which can take over 600 ms by satellite. By using RTA 307 at VSAT 308 and a HTA 303 at VSAT Hub 304, however, a majority of all connections can be made locally with the relevant RTA and HTA. That is, the RWB in remote PC 306 is connected to RTA 305 at the remote VSAT location, and the web server located within the Internet (telecommunications network 104) is connected to HTA 303 at VSAT Hub 304. Sub-systems 303 and 307 then maintain a permanent connection (i.e., persistent connection) between each other that carries all the traffic between PC 306 and the desired web server.

Figure 4:
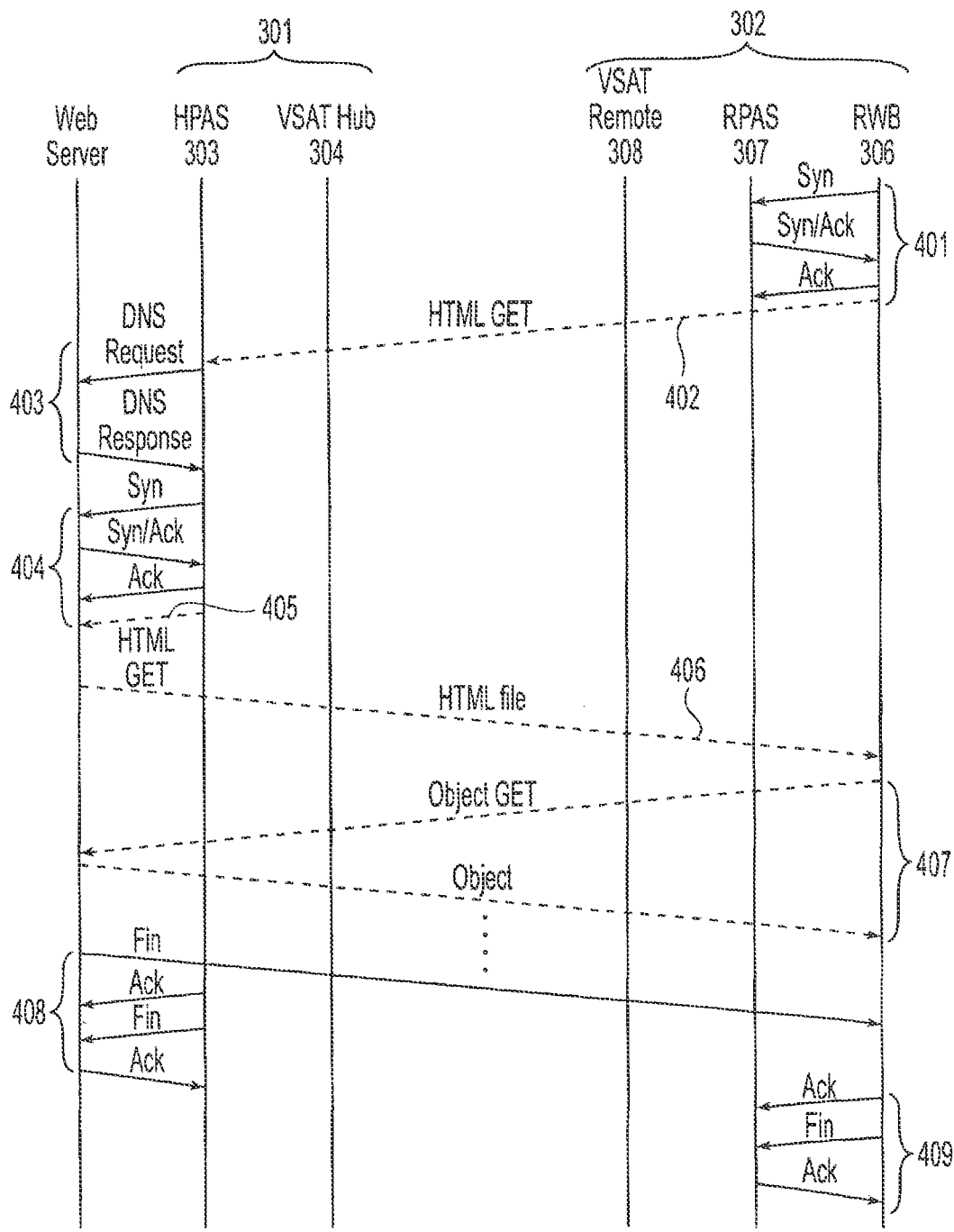
FIG. 4 shows a simplified data flow diagram for a web page access function for a VSAT network having a page accelerator system according to the present invention.

FIG. 4 shows a simplified data flow diagram for a web page access function for a VSAT network having a page accelerator system according to the present invention. As shown in FIG. 4, only application data is sent over the satellite link (assuming a TCP acceleration mechanism is used). In the absence of TCP acceleration, TCP acknowledgements are sent over the satellite link as well. Overhead traffic, such as TCP start and stop commands, are eliminated from the satellite link (with or without acceleration), thereby reducing the total response time and saving resources.

As shown in FIG. 4, access to a web page in a page accelerator system begins when an RWB in PC 306 establishes a connection with RTA 307 with Data Exchange 401. Because PC 306 "knows" the location of RTA 307, there is no need for PC 306 to make a DNS request. As with a true connection to the Internet, data exchange 410 requires at least three communications between PC 306 and RTA 307 for synchronization and acknowledgement of the connection.

After the connection is made between PC 306 and RTA 307, the RWB in, for example, PC 306 requests a desired web page using an HTML GET request at Data Exchange 402. The GET request is sent via RTA 307 to HTA 303.

HTA 303 then makes an initial DNS request for an IP address, and receives the requested IP address from the appropriate DNS server at Data Exchange 403. After the IP address is obtained, HTA 303 establishes a connection using the proper IP address at Data Exchange 404. Both data exchanges 403 and 404 are performed locally between HTA 303 and the desired web server within the Internet (telecommunications network 104). Consequently, any delay that would be experienced through satellite 313 is avoided.

After a connection is established to the desired web server, HTA 303 requests the desired web page using an HTML GET request (Data Exchange 405), and the relevant HTML base page is sent to PC 306 by the web server (Data Exchange 406). As of this point, the only two satellite delays experienced have been for the HTML GET request (Data Exchange 402) and the HTML base page (Data Exchange 406).

When the HTML base page is received by PC 306, the RWB in PC 306 begins to request the individual objects associated with the received HTML base page, and the web server sends the objects to PC 306 (Data Exchange 407). Data Exchange 407 is repeated as many times as necessary for retrieving all of the objects associated with the received HTML base page.

In one embodiment of the present invention, PC 306 requests the objects individually and, consequently, experiences a satellite delay for each request and transfer (i.e., for each Data Exchange 407). Because an average web HTML base page can contain 10 or 20 objects, a large delay can be experienced as each object is retrieved.

When all of the objects have been retrieved, RTA 303 and HTA 307 close their respective connections the web server within the Internet (telecommunications network 104) and with PC 306 through a series of finish and acknowledge communications (Data Exchange 408 and 409, respectively). Because Data Exchanges 408 and 409 are performed locally, no additional satellite delay is incurred.

According to another embodiment of the present invention, an object pre-fetching mechanism further reduces the processing time for the web requests. The object accelerating mechanism extends the functionality of system 300 by significantly reducing the inbound traffic, i.e., the traffic between VSAT Hub 204 and VSAT 306/PC-VSAT-RTA 310.

At hub node 301, a hub object pre-fetch module 312 is incorporated into HTA 303 for facilitating communication with the Internet (telecommunications network 104). All packets pass through hub object pre-fetching module 312. When an HTTP GET request arrives at VSAT Hub 304 from, for example, PC 306, VSAT Hub 304 forwards the GET request to the appropriate web server within the Internet (telecommunications network 104). When the request contains a cookie (i.e., pre-configured information relating the user that is usually saved in the remote machine), the cookie is also saved in VSAT Hub 304. When an HTML base page is delivered as a response from the Internet (telecommunications network 104) to VSAT Hub 304 via HTA 303, the HTML base page is saved in a hub memory within VSAT Hub 304, as well as forwarded to the relevant VSAT 308 via satellite 313.

HTA 303 then processes the HTML base page and begins requesting independent objects of the base page, i.e., the objects that do not interact with the web browser. Potentially dynamic objects that interact with web browsers, such as JAVA scripts and Microsoft Excel files, are handled separately, as will be explained below. After HTA 303 receives the independent objects, HTA 303 forwards the independent objects to the relevant RTA 307. When the original HTML GET request contains a cookie, all further requests from HTA 303 for HTML pages related to the cookie preferably contain the cookie, as well, for efficiently processing the object retrieval. When dynamic HTML files (i.e., written in JAVA script) are received by HTA 303, the dynamic HTML files are compiled (similar to the process that would be performed by the RWB) for providing "page" or "object" links. The objects are then retrieved by HTA 303 and forwarded to RTA 307. Microsoft Excel files are compressed by HTA 303 using existing compression schemes, forwarded, and decompressed by RTA 307 before forwarding to the RWB in PC 306.

At the remote end, an object storage module is installed within RTA 307. When an HTML base page is delivered from VSAT Hub 304, RTA 307 keeps a copy of the base page and forwards the base page to the RWB in PC 306. All of the objects that arrive from VSAT Hub 304 are also stored at RTA 308. When the RWB in PC 306 begins to parse the received HTML base page, the RWB sends requests to RTA 307 for all objects and, when found stored in RTA 307, does not contact the web server directly.

Even with the object pre-fetching mechanism of the present invention, the RWB at PC 306 may wait for a significant amount of time to receive a requested HTML base page (600 ms and the variable Internet delay). Consequently, the prefetching mechanism of the present invention can pre-fetch several base pages to RTA 307 that the RWB in PC 306 is most likely to request. RWBs have the capability for defining a "home page", or a web site that a user always accesses while using the Internet. RTA 307 identifies the home page and maintains an updated version of the base page corresponding to the home page stored in memory. Additionally, the HTA maintains a list of "favorite" pages (popular web sites), and maintains updated versions of the base pages for the favorite sites. According to the invention, the home and favorite web pages are periodically sent from HTA 303 to all RTAs (i.e., RTA 307 and PC-VSAT-RTA 310) using multicast techniques. An RTA, when receiving the favorite base pages, saves favorite base pages in memory as well. This embodiment of the pre-fetching mechanism of the present invention is referred to as "multicasting pre-fetched base pages".

When, for example, the RWB in PC 306 requests a home page or a favorite page that is already stored in the memory of RTA 307, the requested HTML base page is immediately forwarded to the RWB from RTA 307. In conjunction, as with the "pre-fetch" process, the request for the page is also forwarded to HTA 303, and is processed so that objects that are associated with the requested page are updated as described above.

Figure 5:
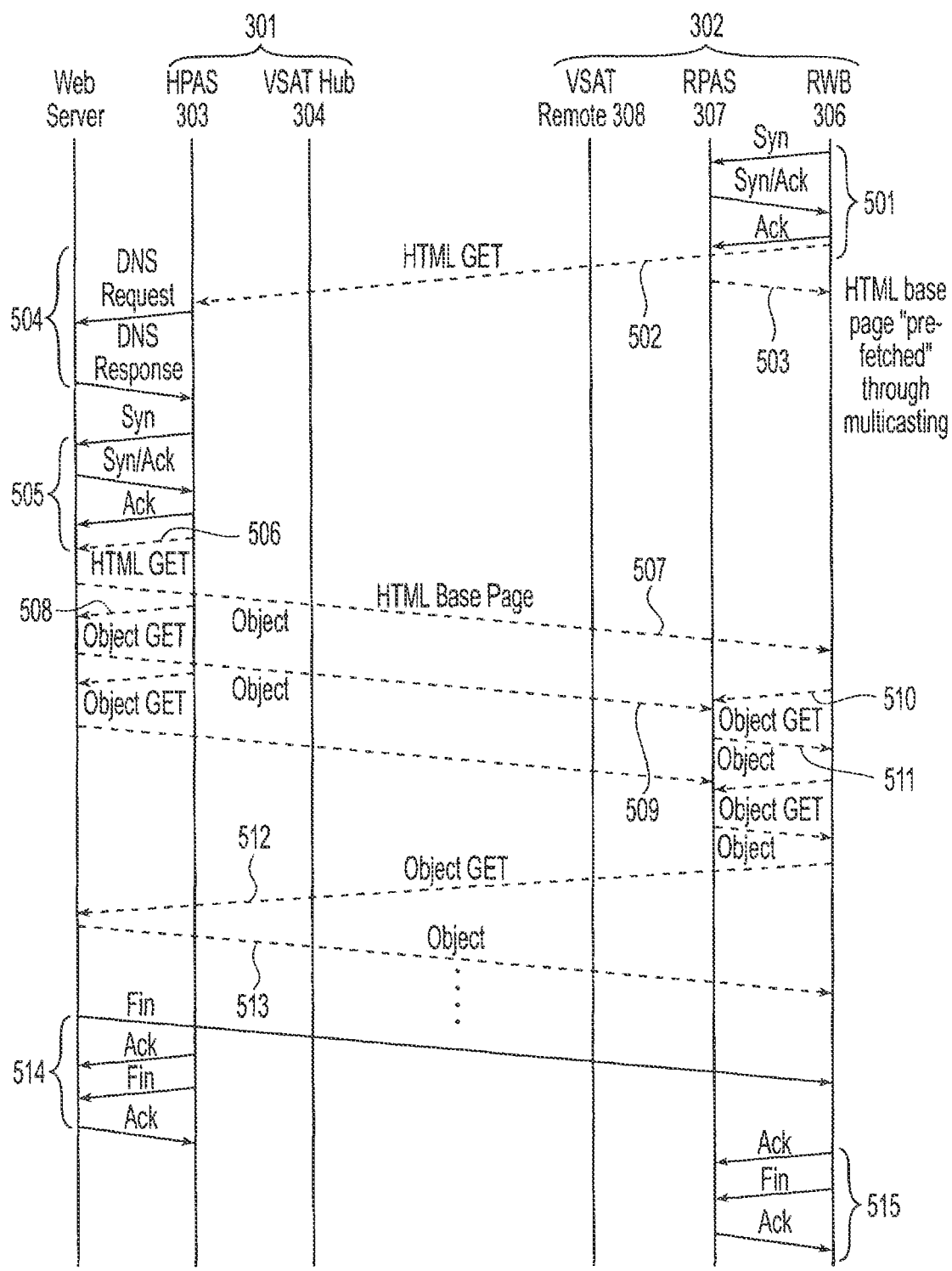
FIG. 5 shows a simplified data flow diagram for a web page access function for a VSAT network having a page acceleration system that uses object pre-fetching according to the present invention.

FIG. 5 shows a simplified data flow diagram for a web page access function for a VSAT network having a page acceleration system that uses object pre-fetching according to the present invention. As shown in FIG. 5, access to a web page by a page accelerator system having a pre-fetching mechanism according to the present invention begins when the RWB in, for example, PC 306 establishes a connection with RTA 307 at Data Exchange 501. As previously described, because PC 306 "knows" the location of RTA 307, there is no need for PC 306 to make a DNS request.

After the connection is made between PC 306 and RTA 307, the RWB in PC 306 requests a desired web page using an HTML GET request (Data Exchange 502). The GET request is sent to HTA 303 via RTA 307. When the HTML base page corresponding to the requested web page has already been provided to RTA 307 through the multicast pre-fetched base page mechanism of the present invention, the HTML base page is immediately forwarded from RTA 307 to the RWB in PC 306 at Data Exchange 503.

At Data Exchange 504, HTA 303 makes an initial DNS request for an IP address, and receives the IP address from the web server. After the IP address is obtained from the DNS server, HTA 303 establishes a connection with the proper IP address at Data Exchange 505. After a connection is established, HTA 303 requests the desired web page using an HTML GET request at Data Exchange 506, and the relevant HTML base page is sent to PC 306 by the web server via HTA 303 and RTA 307 at Data Exchange 507.

As soon as HTA 303 receives the requested HTML base page, at Data Exchange 508 HTA 303 requests the individual objects associated with the HTML base page from the Web. As each object is received, the object is immediately forwarded to RTA 307 for storage at Data Exchange 509. This step is repeated as many times as necessary for retrieving all of the objects associated with the requested HTML base page.

The RWB in PC 306, upon receiving the requested HTML base page, also begins to request the individual objects associated with the HTML base page (Data Exchange 510). This request, however, is local and is made only to RTA 307. RTA 307, in turn, determines whether the requested objects have previously been received from HTA 303. If so, RTA 307 forwards the requested objects to the RWB in PC 306 at Data Exchange 51). When the requested objects have not been previously received by RTA 307, and when RTA 307 determines that the requested objects are to be pre-fetched and forwarded by HTA 303, the RWB requests are locally stored by RTA 307 for a predetermined amount of time while RTA 307 is waiting to receive the corresponding objects from HTA 307.

In some cases, however, it can be necessary for the RWB in PC 306 to communicate directly with a web server using, for example, encrypted GET requests. In such a situation, the RWB in PC 306 sends an object request directly to the web server at Data Exchange 512, and the web server forwards the requested object back to the RWB in PC 306 at Data Exchange 513. After such a communication sequence, however, PC 306 returns to communicating with RTA 307 for normal cases.

Of course, the steps of object retrieval, whether direct or through RTA 307, are repeated by PC 306 as many times as necessary for retrieving all of the objects associated with the requested HTML base page. Because a majority of the requests made by the RWB in PC 306, however, are made locally to RTA 307, there is a minimum satellite delay experienced during the process, significantly reducing the time required for web pages to fully load.

Once all of the objects are retrieved, HTA 303 and RTA 307 close their respective connections with the web server within the Internet (telecommunications network 104) and the RWB in PC 306 through a series of finish and acknowledge communications (Data Exchanges 514 and 515, respectively). Because Data Exchanges 514 and 515 are each performed locally, the data exchanges do not result in any additional satellite delay.

Figure 6:
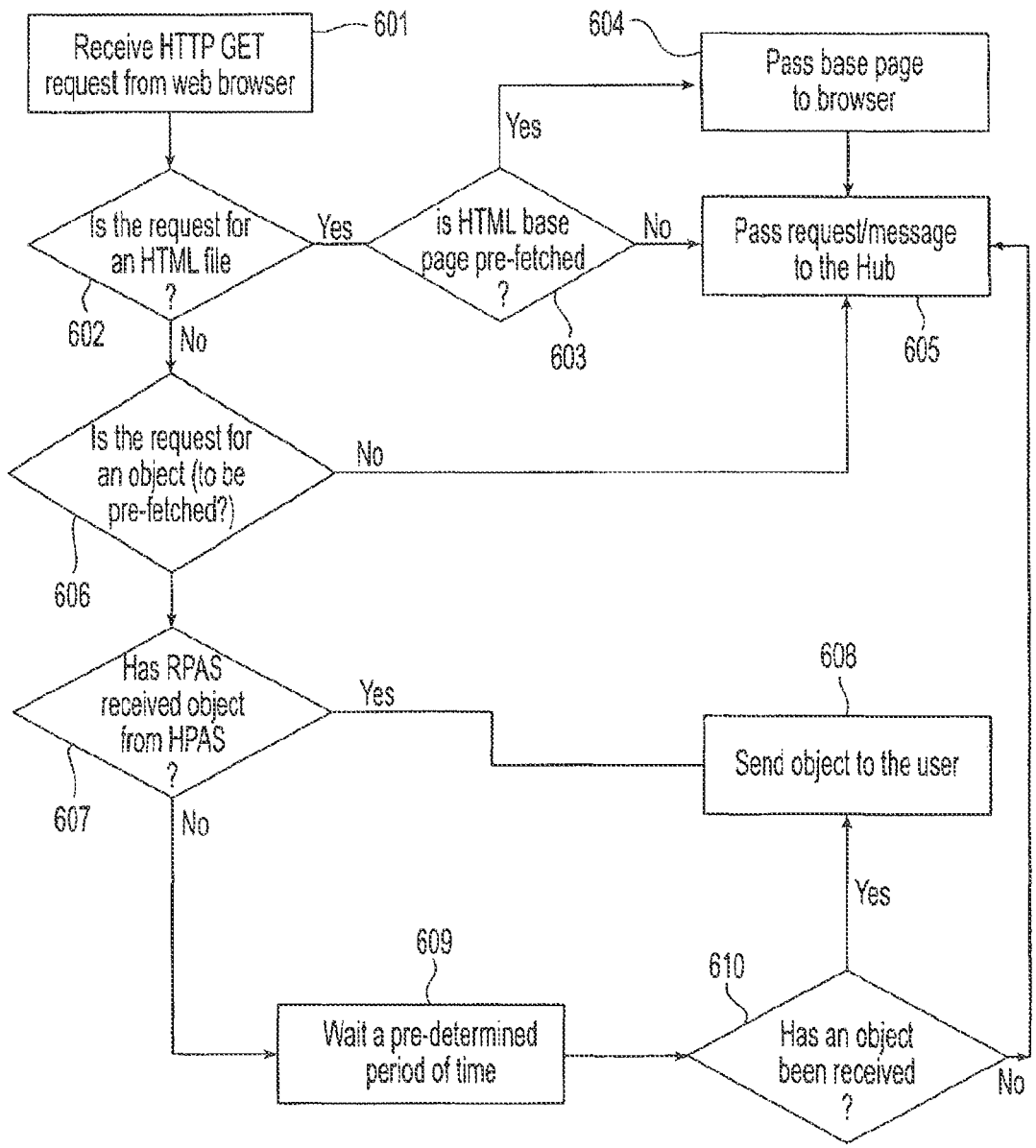
FIG. 6 is a flowchart showing a process used by an RTA for providing page acceleration according to the present invention.

FIG. 6 shows a flow diagram of a process performed when, for example, RTA 307 receives an HTTP GET request from the RWB in PC 306 (Step 601). At step 602, RTA 307 determines whether the HTTP GET request is a request for an HTML base page. If so, flow continues to step 603, where RTA 307 verifies whether a copy of the requested base page is stored in the memory of RTA 307. If, at step 603, RTA 307 determines that the requested base page is stored in the memory of RTA 307, flow continues to step 604 where RTA 307 forwards the base page to PC 306. Flow continues to step 605, where RTA 307 forwards the request to VSAT Hub 304. If, at step 603, RTA 307 determines that the requested base page is not stored in the memory of RTA 307, flow continues to step 605.

If, at step 602, RTA 307 determines that the GET request is not for an HTML file, flow continues to step 606, where RTA 307 determines whether the GET request is for an object that is to be prefetched. When the object is not a prefetched object, flow continues to step 605, where RTA 307 forwards the request to VSAT Hub 304. If, at step 606, RTA 307 determines that the requested object is a "prefetched" object, flow continues to step 607 where RTA 307 determines whether RTA 307 has already received the object from HTA 303. If so, flow continues to step 608, where RTA 307 sends the object to PC 306. If, at step 607, RTA 307 determines that the object has not yet been received from HTA 303, flow continues to step 609 where RTA 307 waits a predetermined period of time.

Upon expiration of the predetermined period of time, flow continues to step 610 where RTA 307 determines whether the object has been received. If so, flow continues to step 608, where RTA 307 sends the object to PC 306. If not, flow continues to step 605 where RTA 306 forwards the object request to VSAT Hub 304.

Table 1 shows a comparison between access time for a conventional VSAT network, for a VSAT network with a persistent connection without object pre-fetching (FIG. 4), and for a VSAT network having a complete page acceleration system according to the present invention (FIG. 5). In making the comparisons, the following assumptions have been made for simplifying the analysis.

The response time of a web server from the time VSAT Hub 304 makes a request to when the request is answered is assumed to be 100 ms. The satellite delay for passing requests and objects between hub antenna 305 and remote antenna 309 through satellite 313 is assumed to be 500 ms. The transmission time of a GET request over satellite 313 is assumed to be 60 ms. The same GET request has a transmission time of less than 5 ms between VSAT hub 304 and the web server within the Internet (telecommunications network 104). As a result, the delay experienced between VSAT hub 304 and the web server will be neglected and treated as zero. The transmission time of an object is assumed to be 40 ms.

It is assumed that the web browser opens two connections to every web server for retrieving the page objects. It is also assumed that web pages with up to 10 objects reside on a single server. For more complex pages, it is assumed that the HTML for the requested page resides on one server and all the objects reside on a different server. All objects are assumed to be simple, i.e., they can be pre-fetched. The TCP connection establishment delay over the LAN at the remote VSAT is negligible and is assumed to be zero. A connection establishment delay at the hub side is assumed to be 20 ms. A DNS server response time is assumed to be 25 ms.

These assumptions do not take into account the uncertainty of Internet delays, web browser behavior, and web page design. Because such delays can occur regardless of whether there is a page acceleration system, they have been disregarded.

TABLE 1

A COMPARISON OF WEB ACCESS TIMES

| | Conventional VSAT System | | Page Acceleration without Pre-fetch | | Page Acceleration with Pre-Fetch | |
|---|---|---|---|---|---|---|
| No. of Objects | Seconds | No. Requests | Seconds | No. Request | Seconds | No. Request |
| 1 | 2.6 | 7 | 1.5 | 2 | 0.9 | 1 |
| 10 | 6.1 | 20 | 5 | 11 | 1.6 | 1 |
| 20 | 10.8 | 36 | 8.5 | 21 | 2.4 | 1 |

The 'Seconds' in Table 1 refers to the expected amount of time for a web page having the indicated number of objects to load. The 'No Requests' columns refer to the expected number of requests that may be sent to fully load the desired web page from the Web Browser (RWB) to the Web Server in the Internet.

As shown in Table 1, the access time for a Page Acceleration system without pre-fetching is reduced in comparison to a conventional VSAT system, and the access time is significantly reduced when the Page Acceleration system uses a pre-fetch process.

Although the descriptions above refer to communications between VSAT hub 304 and PC 306 via remote VSAT 308 and RTA 307, such communications could also be between VSAT hub 304 and PC-VSAT-RTA 310, their operation would be the same, as would the results of Table 1.

Secure Network Protocol Acceleration

Aspects of the present invention include page acceleration over a secure connection, such as one using a secure sockets layer, for example. An exemplary embodiment of the present invention involves acceleration of secure communications between a web browser, operating on a computer and a web site using secure protocol operating over a lower level layer such as a TCP/IP layer, transmitted over a satellite communication system. Another exemplary embodiment involves secure certificate generation and handling.

Secure communications acceleration may be accomplished using a remote terminal coupled to a computer. The remote terminal may intercept signals intended for the web server and may generate secure protocol specific data to simulate the responses of a web server that would ordinarily be transmitted to the computer in accordance with a secure protocol, such as SSL for example. The secure protocol, accelerated using generated certificates, may enable the remote terminal to convert data into a format for transmission through the satellite communications system, and eventually to the web server, while maintaining the secure protocol connection with the computer. A secure protocol exchange may also occur between the web server and a hub, or other similar device in communication with the web server and the satellite communications system. The hub may also maintain a connection with the web server by generating signals indicating that the signals were forwarded from the computer, and may intercept signals transmitted by the web server intended for the computer. The hub may receive data forwarded from the destination terminal through the satellite communication system, may convert the data into the secure protocol format and may forward necessary data to the web server. Accordingly, an embodiment of the invention enables a web browser operating on a computer to communicate securely using a secure protocol, such as the SSL protocol, operating over a TCP/IP layer through a satellite communication system with an acceptable amount of delay.

An embodiment of the present invention may relate to the encryption of data above the transport level, e.g., at the application layer. In an SSL environment, for example, handshaking may be required to exchange secure pages. The number of handshakes required for exchange of each image in an SSL secured page, for example, is dependent upon, among other things, the type of encryption selected by the client and/or server, or whether the client and server both require authentication during the transfer. For example, in typical applications in which full handshaking is performed, for each image in a page there is between four and eight handshaking exchanges required to establish a SSL connection. Where there are, for example, eight exchanges required, the delay over the satellite could be as much as four seconds of additional transfer time for each image in an SSL encrypted page. Where there are 20 images, the net delay may add 40 seconds to the transfer of a page on an SSL secure link. Accordingly, a substantial need arises for accelerating the secure HTTP link.

The 40 second delay previously described in the illustrative embodiment is calculated assuming the use of nonsimultaneous sessions. Where there are a number of simultaneous connections, the maximum delay time may be reduced accordingly. For example, where the default value for the browser establishes two simultaneous connections, the transfer time would be reduced to 20 seconds. As the number of connections at the browser increase, another problem arises. With the increase in the number of connections, the number of handshakes required to setup the total number of connections increases by a factor corresponding to the number of connections. Thus, by increasing the number of connections, each new page may increase the number of handshakes. Unfortunately, a reduction in the delay resulting from the increase in the number of connections in the browsers may be offset by increased handshaking. In addition, increasing the number of connections substantially increases the resource utilization of the ISP provider, including the satellite network provider. Therefore, a new technique is required to accelerate the pages.

Embodiments of the invention may utilize an increase number of connections, but such embodiments involve an improvement upon the use of a greater number of connections. For example, in some exemplary embodiments it may be helpful to have the hub server monitor and count the number of connections for each individual remote terminal and limit the number of connections that the remote terminal may utilize. As a result, the system may conserve bandwidth and may also prevent a single remote terminal from monopolizing the bandwidth associated with a particular hub.

Embodiments of the present invention may utilize a single tunnel between the remote terminal device and the hub. In these embodiments secure protocol acceleration may utilize the existing page acceleration techniques and may sit on top of the existing acceleration and page acceleration protocols.

Specifically, in an embodiment of the invention, secure communication acceleration over a satellite network may involve the handshake acknowledgements between a browser and a web server. To that end, a remotely located secure protocol accelerator ("remote protocol accelerator" or "RPA") may be configured as a proxy server in communication with the browser, as a software module implemented as a driver in the personal computer, or be incorporated into a modem, for example, transparent to the personal computer. A hub page accelerator ("HPA") is typically located at the hub, the proxy server located at the hub, or the web server.

Signals from the computer on which an Internet browser may be operating may be redirected to the RPA as a proxy server. An HTTPS connection is typically initiated via a HTTP "CONNECT" message sent from the browser to the proxy server, the remote page accelerator in this case. The CONNECT message is specific to secure HTTP in that only when a secure HTTP (or HTTPS) connection is formulated does the message transmit from the browser to the RPA proxy server. In accordance with aspects of the present invention, the proxy server may implement remote page acceleration.

In standard HTTPS communications, employing applications running on TCP/IP, for example, the CONNECT message might be passed directly to the proxy server located in the hub equipment. However, when SSL acceleration is employed, the CONNECT message sent from the browser may be intercepted by the remote page accelerator and an "OK" packet may be returned to the browser, which may be sent directly from the remote page accelerator. The browser may next initiate a SSL handshake connection by sending a "HELLO" message to the web server, which may also be intercepted by the RPA. The handshake connection between the browser and the RPA may be a standard SSL connection continues and may include all of the standard SSL handshaking.

The RPA may have its own public key and private key, which may be generated on the fly, and keys may be assigned for every remote terminal. In accordance with further aspects of the invention, each individual RPA may be configured to be a certificate generator. In this manner, each RPA may dynamically generate its own public and private keys. Such key generation may be performed either initially or as each session is started. Thus, the RPA may generate and exchange the secure keys with the browser, so that both may generate a master secret key. Packets of data may then be transmitted from the RPA to the HPA over the satellite communication system.

At the web server side of the communication, the HPA may proceed to setup a secure connection with the web server as follows. The standard SSL handshake protocol includes the transmission of initial handshaking signals including a CONNECT signal. Additional signals may be exchanged between the HPA and the web server, being transmitted transparently through the proxy. These messages may include, for example, the "OK", client "HELLO", server "HELLO/certificate", premaster secret, exchange of master secret keys and finally, the GET command. The master secret key between the HPA and the web server may be established in the connection between the HPA and the web server, and may be a different master secret key from that established by the browser and the RPA. Thereafter, all GET commands and/or other messages from the browser and/or the web server in the link between the HPA and the web server may be encrypted using this master secret key. Over the newly established SSL connection, between the HPA and the web server, standard HTTPS data may be exchanged in a normal fashion.

In this manner, the handshake protocols necessary for generating, for example, the master secret keys and/or other encryption keys between the HPA and web server can be exchanged at a high rate of speed, and the tunneling across the satellite connection and/or other wireless connection between the HPA and RPA is minimized. As a result, the overall connection time for establishing a secure connection between the browser and the web server, across the satellite network, may be substantially accelerated.

In addition to the secure protocol acceleration just described, the page acceleration discussed in the application incorporated by reference, patent application Ser. No. 09/781,554 entitled System and Method For Internet Page Acceleration Including Multicast Transmission, filed Feb. 13, 2001, may be used to accelerate secure page transfers across the satellite link by assembling a series of request acknowledge portions at the hub page accelerator and then transferring those pages in bulk across the HPA/RPA link tunnel connection to the browser in the manner described in the previous application.

To summarize one aspect of the invention, transmissions from the web server to the browser may be initially transmitted across secure connections between the HPA and the web server, and may pass transparently through a proxy server. At the HPA, the HTTPS data may be decrypted using a set of keys and then may be transferred from the HPA to the RPA using the standard encrypted tunnel across the satellite network. Once at the RPA, the data may then be re-encrypted using the set of keys of the RPA and may be transmitted to the browser using standard SSL protocols, for example.

In the hub, components of the page may be assembled by the hub page accelerator in varying degrees. In one embodiment, as each image may be downloaded and acknowledged from the hub page accelerator and/or proxy server in the hub, the image may immediately be transmitted to the RPA and forwarded to the browser. In alternative embodiments, a series of images may be queued in the HPA and then forwarded to the RPA across the tunnel. Once the original master session is established between the HPA and the web server, as additional web pages and/or images are accessed from the browser to the web server, additional handshaking may occur before each image and/or web page may be transmitted. Typically, this handshaking may be less complex than the initial setup handshaking, nevertheless it may still require as many as eight transmissions between the HPA and the web server and between the browser and the RPA.

A substantial reduction in the amount of delay experience by the user may be achieved in the above mentioned environment employing aspects of this invention. With respect to the page acceleration disclosed in the application incorporated by reference, since the secure protocol communication may be decrypted at the HPA using the master secret key, it is possible to parse the request for pages at the HPA and request all objects immediately from the server using multiple connections. As a result, the pages, and all of the images located within those pages, may be returned at a substantially higher rate than would normally be realized without page acceleration.

The returned data includes a web page, which may specify each of the images and/or other objects contained in that web page. Through parsing, these images and/or objects may be preferably pre-fetched in the HPA server, however, in certain circumstances, such as if the HPA is integrated with the proxy, for example, the images may be pre-fetched and cashed in a proxy server for transfer to the RPA. As a result, the images may be made immediately available at the proxy server for forwarding to the browser, and may also be pre-fetched in the RPA for immediate transmission to the browser once the request from the browser is initiated. Thus, the perceived speed of the communication experienced by the user may be substantially improved. Therefore, depending on the configuration of the web server, the reduction in latency time can be significant.

Some embodiments of the present invention overcome the insufficiencies associated with proxy servers which do implement a pre-fetch, in that such servers cannot effectively pre-fetch during a secure connection because the transmission from the server is encrypted. A substantial advantage attributable to some embodiments of the present invention is that it allows pre-fetching even in connections involving secure protocols through the use of the HPA. Embodiments of this invention may be expanded to use in pre-fetch servers such that, for example, the proxy and pre-fetch server may be integrated into the HPA. Thus, communications using pre-fetching servers may now be expanded to include all secure protocol connections. This is a substantial improvement over the current state of the art.

An additional advantage of some embodiments of the present configuration is that the close connection message may be intercepted by the HPA such that it may not necessarily passed to the browser. Thus, the secure protocol close connection signal may be intercepted and responded to by the HPA, and the communication may be re-open in a manner transparent to the browser. In the event that the connection is to be terminated, the RPA then terminates the secure protocol connection with the browser at the end of the secure session.

Figure 7A:
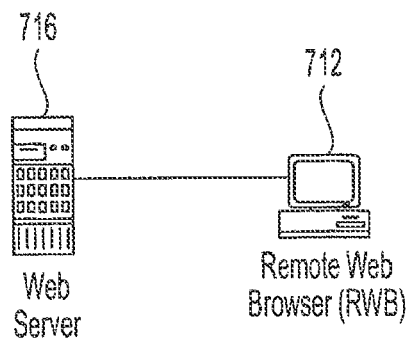
FIG. 7A is a simplified schematic block diagram illustrating a conventional secure connection between a web browser and a web server.

Referring to the accompanying figures, an exemplary embodiment depicting a conventional SSL connection is described in FIG. 7A as the direct service connection between the browser 712 and the web server 716. To compensate for delay that results when such connections are established over a satellite communications system, referring to FIG. 7B, the connection is broken down into secure links A1, A2, and A3. Representative Link A1 links the remote web browser 712 with the page accelerator 713. Link A2 represents the satellite communication over satellite 725. Link A3 represents the connection between the hub page accelerator 705 and web server 716. Of course, various combinations of components can be utilized to communicate over the links in a variety of manners. Link A2 may provide an encrypted link using a conventional satellite encryption technique. Accordingly, secure protocol acceleration need occur only on links A1 and A3 for which the terminals intercept data specific to the secure transmission and transmit the content of the secure transmission. The particular protocol for acceleration a secure connection on links A1 and A3 is described, using an SSL communication as merely an example, in exemplary embodiments illustrated in FIG. 8.

Again referring to FIG. 7B, SSL authentication, for example, on link A1 may be conducted by Spacenet, the encryption on link A2 may also handled by Spacenet, and the SSL authentication, for example, on link A3 may also be performed using standard SSL protocols between the Spacenet hub and the web server. Thus, each link in the connection may be secured. To establish and/or during communication, the remote browser 712 at the computer may receive appropriate signals to suggest that the browser has established a secure connection with the web site of interest, as is discussed in more detail below.

Figure 8:
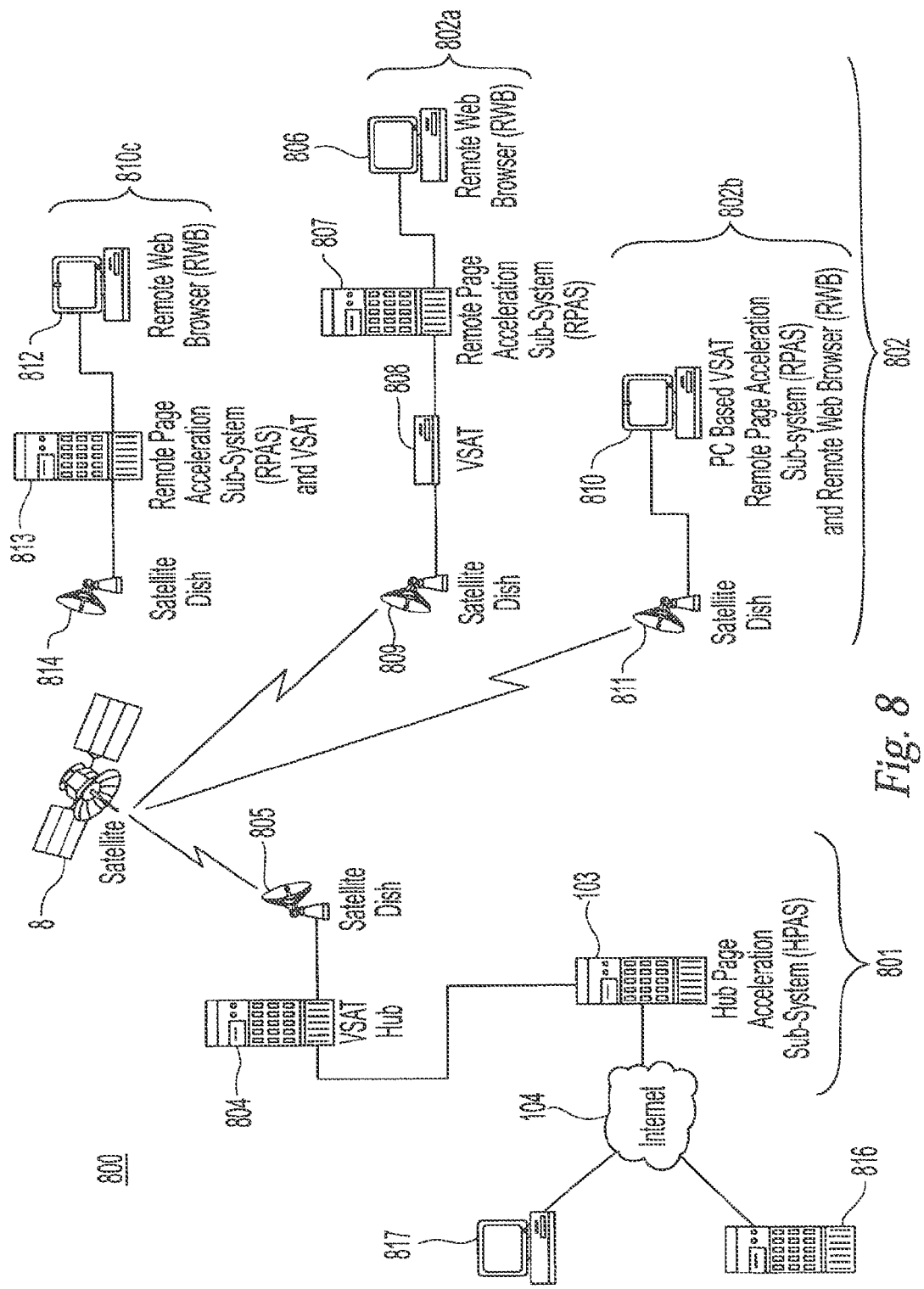
FIG. 8 is a schematic block diagram of a portion of an exemplary communications network illustrating a page accelerating system for communications over a secure communications network in accordance with one aspect of the present invention.

FIG. 8 is a schematic block diagram of a portion of broadband communications network 100 (FIGS. 1A and 1B) that provides a page accelerating system 800 according to the present invention, similar to the diagram of FIG. 3 above. For simplicity, FIG. 8 shows only the functional blocks of the secure page accelerating system of a preferred embodiment of the present invention. For purposes of clarity, the individual components have been indicated using similar reference numerals. The individual components of a preferred embodiment for performing acceleration of a system communicating over secure network follows.

Page accelerator system 800 may include a hub node portion 801 and at least one client node portion 802 for performing web browsing and the like. Hub node portion 801 may be connected to a web host 816 or Internet computer 817, or such similar devices, including accessible web pages associated with various web sites. The connection of hub 804 to the web site of interest may be established through telecommunications network 104 (FIGS. 1A and 1B), again, such as the Internet ("WWW"), including a web server. Alternatively, telecommunications network 104 may consist of a local area network (LAN) or a wide area network (WAN) that, in turn, is connected to the Internet. Once again, network 104 may include information that is preferably stored in the form of web pages. Hub node portion 801 may be communicatively coupled to each client node portion 802 over a satellite communication link utilizing a satellite 825 of a satellite network in a well-known manner.

Hub node portion 801 may include a Hub Tunnel Agent 803 (also referred to herein as Hub Page Accelerator (HPA)), a VSAT Hub 804 (hub) and a central satellite dish antenna 805. HPA 803 may be connected to telecommunications network 104 to operatively receive and send communications messages from/to telecommunications network 104 in a well-known manner. HPA 803 may be connected to VSAT Hub 804, and VSAT Hub 804, in turn, may be connected to central satellite dish antenna 805.

According to one exemplary embodiment of the present invention, a client hub portion 802(*a*) may include a personal computer 806 (also referred to herein as computer) operating Remote Web Browser (RWB)), a Remote Tunnel Agent (RTA) 807 (also referred to herein as a Remote Page Accelerator (RPA)), a VSAT 808 and a remote satellite dish antenna 809. This exemplary embodiment corresponds to PC 122 and remote VSAT station 123 shown in FIGS. 1A and 1B. According to another exemplary embodiment of the present invention, a client hub portion 802(*b*) may include a PC-VSAT-HPA 810 having an integrated RTA and an RWB, and a remote satellite dish antenna 811. This second exemplary embodiment corresponds to PC-VSAT 121 shown in FIGS. 1A and 1B. In yet a further embodiment, a client hub portion 802(*c*) may include a Remote Web Browser 812, and a VSAT incorporating a Remote Page Accelerator 813. Of course, any combination of the identified components, or similar components, may be adapted for use in the client hub portion 802 consistent with the disclosed invention.

VSAT 808, PC-VSAT-RPA 810, and VSAT-RPA 812 may communicate with VSAT Hub 804 via remote satellite dish antennas 809 and 811, 814, respectively, satellite 813, and central satellite dish antenna 805. VSAT Hub 805 may connect to telecommunications network 104 (i.e., the Internet) via HPA 803, and may allow a user to perform activities on the Internet, such as Internet browsing, using the hypertext transfer protocol (HTTP).

As previously described, a computer can send an HTTP GET request for a page by establishing a connection between the computer and the appropriate web server. That is, for example, the web browser in remote PC 806 may be connected to RTA 805 at the remote VSAT location, and the web server located within the Internet (telecommunications network 104) may be connected to HPA 803 at VSAT Hub 804. Sub-systems 803 and 807 may then maintain a permanent connection (i.e., persistent connection) that carries all the traffic between PC 806 and the desired web server.

As described with respect to the embodiment illustrated in FIG. 3, in embodiments of the page accelerator system of the present invention, hub node portion 801 and client node portion 802 may be arranged using any number of configurations and placed in a variety of locations consistent with the scope of the invention. Of course, while only a single satellite 813 has been illustrated in FIG. 8, it should be understood that system 800 may include a plurality of satellites forming the satellite network. Moreover, it should be understood that system 800 may include a plurality of hub node portions 801 connected to one or more telecommunications networks 104. Further, system 800 may include a plurality of client hub portions 802.

Figure 9:
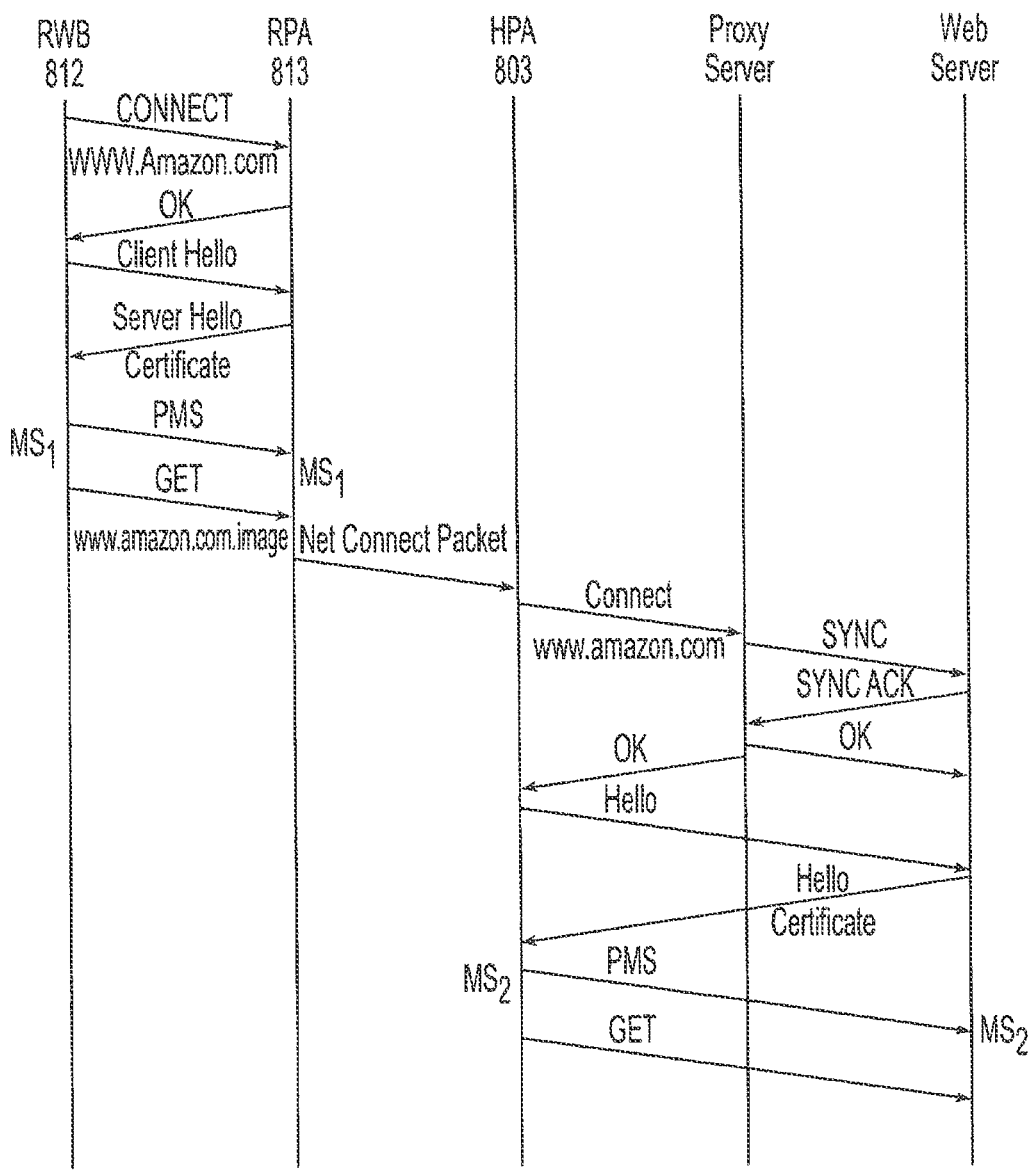
FIG. 9 shows a simplified diagram illustrating the transmission of signals between the various component parts of a secure communications network in accordance with one aspect of the invention.

FIG. 9 depicts a preferred embodiment for performing secure protocol acceleration; establishing a secure connection between a computer operating a web browser and a web site of interest over a satellite communication system; and use of the satellite communication system in a manner transparent to both the browser and the web site of interest. This technique may be accomplished by mimicking the secure protocol data, SSL data in this example, and transmitting signals to the computer and the web server to simulate a typical secure communication.

Specifically, in the exemplary embodiment of FIG. 9, the invention illustrated may establish a secure link using the HTTP protocol over a SSL layer or other HTTPS layer. In the first step of the protocol, the browser may attempt to establish a connection with the web server using a standard HTTPS "CONNECT" command. The "CONNECT" command may be intercepted by the RPA, or similar remote terminal, and an "OK" signal may be transmitted by the RPA to the browser. The browser may next transmit a client "HELLO" command which may be intercepted by the RPA. In response, a web server "HELLO" may be generated by the RPA and transmitted to the browser.

Establishment of an SSL communication may further require transmission of a server certificate by the web server to the browser, typically transmitted in the server "HELLO" signal. In accordance with SSL protocol, the certificate typically contains the server's public key, the dates for which the certificate is valid, the certificate's serial number, the server's host name, the Certification Authority's (CA) domain name, and the Certification Authority's signature, and may omit or include additional features including extensions. In this embodiment, such a certificate may be verified by the browser in a verification step before additional communications will be authorized. In embodiments of the invention, certificates created under the apparent authority of the Certificate Authority ("CA") may be produced and provided locally by the browser, satellite modem or hub, for example. For example, SSL uses X509 certificates.

Upon receipt, the browser may check the certificate to determine whether the certificate has expired. The host name listed on the certificate as that of the web server may be reviewed to determine if it matches the host name of the web site of interest. The browser also determines if the CA, used to sign the certificate, is one previously identified by the browser as a trusted CA. The browser may verify the CA's signature using the public key. Additional steps may also be performed, beyond those required by the secure protocol, including steps to verify that the host name of the CA matches that indicated on the certificate. Once the verification process for verifying the identity of the web server has been successfully completed, the public key from the RPA in the server "HELLO" may be utilized by the browser to generate a secure session between the browser and the RPA. Should the web server require a certificate from the browser, such requests may be forwarded to the browser and an additional validation process, including an exchange of information, may be carried out with the browser by the RPA, which would, validate the communication with the browser.

In the handshaking steps that may follow the initial server verification step, there may be an exchange of information between the browser and the web server, via the RPA. For example, through signals transmitted between the browser and the server, the browser may provide a list of available cipher schemes, from which the web server selects a desired cipher scheme and transmits to the browser an indication of that selection. Also, as illustrated using previously received information, the browser may generate and transmit a premaster secret key (PMS). Through the exchange of such information and the premaster secret key, the browser and RPA may establish a symmetric master secret (MS) key which may be resident both at the browser and the RPA, illustrated in FIG. 9 as $MS.sub.1$. The master secret key may be a symmetric key used for both encryption and decryption of data such that the browser and RPA may send and receive messages using the same master secret key. As a result of establishing a master secret key at both the browser and the RPA, a secure session is initiated and signals may then be transferred back to the HTTP session.

Once created, the master secret key ($MS.sub.1$) may then be utilized to encrypt a GET command from the browser to the RPA to instruct the RPA to get, for example, a web page file at www.amazon.com/image1. The RPA may now have everything it requires to begin communicating with the hub, including the original web server location, for example, amazon.com, contained in the connect message together with the location on amazon.com of the file contained in the GET message. Accordingly, the RPA may then initiate a connection across the satellite communication system to the hub server as follows.

Again referring to FIG. 7B, when the browser is activated in the remote client terminal, a tunnel may be established across link A2. Thus, once the RPA has the connect address, as well as the connect location, both extracted from the GET message, it may forward this information in packets of data across the tunnel on link A2 to the hub page accelerator located in the hub node portion. With respect to FIG. 7B, the link A2 may or may not be encrypted depending on the particular configuration of the over the air communication channel. In the most preferred embodiments, encryption may be used and, in particular, a tunneling encryption algorithm may be employed such that the link A2 is secured. For example, in Gilat's 360e, an encryption algorithm is utilized on top of a direct video broadcast technique.

Specifically, access to the web server or internet computer 817 may be initiated by incorporating information collected by the RPA through the connecting GET message and encapsulating that information in a tunneled message to the HPA containing the information necessary to access a web page on the remote web site. The information assembled by the RPA, including the connect information and the GET page information as well as the HTTP normal information, may be assembled in a "NET CONNECT PACKET." As illustrated in FIG. 9, the NET CONNECT PACKET may be transferred over the satellite via the tunneling connection to the HPA and the following processing may occur.

At the HPA, the first step in this exemplary embodiment may be to remove the header corresponding to a request for a SSL connection with a particular remote web server, "amazon.com" in the previous example. Typically, port 443 may be utilized to request a secure SSL connection, in accordance with one exemplary embodiment of the invention. Alternatively, the identity of the port to be used in the communication may be passed to the browser. Currently, in this exemplary embodiment, HPA 803 located in hub node 801 includes a proxy server. The proxy server may provide typical domain name services such as look up of IP addresses associated with particular web servers as well as pre-fetching and other functions which may be incorporated directly into the hub, or may alternatively be implemented via a proxy server. Where a proxy server is implemented, the SSL session may set up between the HPA and the web server through the proxy server.

Returning to FIG. 9, initially the HPA may build a CONNECT message in accordance with HTTP protocol, for instructing the proxy to connect to the web server, using the information extracted from the NET CONNECT PACKETS received from the RPA. For example, a CONNECT message may be sent from the hub page accelerator in response to the NET CONNECT packet asking for a connection to, for example, amazon.com. The proxy server may then attempt to establish a connection with the web server, using standard TCP handshaking which includes at least transmission of a synchronization signal ("SYNC" signal). The proxy server might receive a "SYNC ACK" signal, and transfer an "ACK" signal back to the web server establishing a connection with the target web site, for example, amazon.com. Once the proxy server has established the connection an "OK" signal may be transmitted back to the hub page accelerator 803. In the event that there is no connection made to the web server, the HPA will instruct the RPA that the connection was not possible, and the RPA will then inform the browser that the connection was not correctly made. The browser may be reset accordingly. Alternatively, the RPA may proceed with the transmission using a standard communication, without the benefit of acceleration. If the connection through acceleration is not possible, a bypass transmission may be performed. Where there is a successful connection, however, the processing may continue as follows.

In a manner similar to that described with respect to the communications between the browser and the RPA, establishment of a secure connection may require verification steps and transmission of a premaster secret key from the HPA to the web server. As previously described, the web server "HELLO" typically includes a server certificate. In accordance with SSL protocol of one exemplary embodiment, the certificate contains the server's public key, the dates for which the certificate is valid, the certificate's serial number, the server's host name, the Certification Authority's (CA) host name, and the Certification Authority's signature. Such a certificate transmitted from the web server may be verified by the HPA in a verification process. Of course, the verification steps may be skipped and the data necessary for continuing the communication between the HPA and the web server may be extracted for use in further communications. Where the web server requests a certificate from the browser, the HPA may generate and may transmit a certificate in a manner similar to that previously described with respect to generation of certificates by the RPA.

Information, including the public key extracted from the certificate transmitted to the HPA from the web server, may be utilized by the HPA to generate a secure session between the web server and the HPA. In the initial handshaking steps following the verification step, there may be a similar exchange of information as that exchanged between the browser and the web server in a corresponding set of steps. For example, the cipher scheme may be selected and information identifying the selected scheme may be exchanged. Also, a premaster secret key may be generated and transmitted. Through the exchange of random numbers and premaster secret keys, the HPA and the web server may establish a symmetric master secret (MS.sub.2) key which may be resident in both and used for encryption and decryption. Having determined the master secret key, an SSL session may be initiated between the HPA and the web server. Data received by the HPA over the satellite communications system may then be reformatted for transmission to the web server over the newly established SSL connection.

In one embodiment, once the secure connection has been established, the proxy server may merely serve as a pass through device. For example, the master secret key may be utilized to encrypt a GET command originally transmitted by the browser and intercepted by the RPA. The RPA may forward that request to the HPA which encrypts the data using the master secret key and forwards that request to the web server. Thus, after the establishment of a secure connection, the proxy thereafter may serve only as a pass-through entity. As such, requests from the HPA may be passed through the proxy to the web server and answers from the web server may be transferred through the proxy to the HPA.

The preceding description of an exemplary embodiment of the invention, one involving a secure communication over a satellite communication system, described a communication employing the SSL protocol. However, the description is not intended to limit the scope of the invention. Any number of secure protocols may be used in a manner consistent with the described invention. Furthermore, while the preferred embodiment described an encoding technique in which the data may be encoded using public-key cryptography, any number of ciphers may be used in accordance with the invention without departing from the scope of the claimed invention. It should also be appreciated that modifications, substitutions, additions or omissions of various components recited in the preceding description can also be made without departing from the true spirit and scope of the invention. As noted, the secure protocol acceleration technique may be configured as part of the remote terminal device, may be incorporated directly into an indoor unit, such as a modem coupled to a satellite dish, may be a software module implemented as a driver in a remote terminal, or may be incorporated in any manner consistent with utilization of the invention as described. When incorporated into the indoor unit, the PC client software requires no modification. In this embodiment, the modem may provide completely transparent secure protocol acceleration. Alternatively, an embedded plug-in module may be utilized to provide secure protocol acceleration directly, through the use of the client PC.

As previously described, the secure protocol acceleration module may be resident both at the remote terminal and in the hub. In a manner similar to the system and method previously described with respect to the remote terminal, secure protocol acceleration and/or acceleration may also be located in the hub node. Thus, a hub server may have a multi-threaded client that can handle any number of remote units and/or may also include acceleration hardware that would enable high speed secure access. The system may include a rack mount unit having several secure protocol hardware devices plugged in to the rack mount unit. In this manner, the hub may provide acceleration services for a multitude of remote clients.

An additional aspect of the invention includes the generation of certificates for establishing a secure connection between, for example, a browser and a web server, while in fact those devices may be communicating through intermediaries, the RPA and HPA, coupled through a satellite communication system. For example, the RPA may be responsible for ensuring that the browser receives certificates, and may generate such certificates for transmission to the browser.

Distributed Certificate Sharing

In an exemplary embodiment of the invention involving protocols requiring certificates, certificates may permit the source and the requesting devices to authenticate one another by verifying their respective identities as participants in a communication, and thereby enable encrypted and secure transfers between the source and the destination. In accordance with SSL protocol, for example, the certificate may contain the server's public key, the dates for which the certificate is valid, the certificate's serial number, the server's distinguished name (DN), the Certification Authority's (CA) DN, and the Certification Authority's signature, and may omit any of the preceding or include other information as well. A distinguished name (DN) may be a series of name-value pairs that uniquely identify an entity. The certificate may also include information describing the cipher used to create the digital signature. The digital signature for a given certificate may typically be generated by encrypting the data of the certificate with the CA's private key.

The concept of distributed certificate sharing may involve the generation of multiple certificates for links, or sub-links within each link which each may require a certificate, between the components employed in the communication system. In accordance with the exemplary embodiment illustrated in FIG. 7B, certificate sharing at the A1 link may occur between the browser and the RPA, a second exchange of certificates may occur across the tunneled connection A2, and a third certificate sharing may take place between the hub location and the HPA and the remote web server. To reduce latency, the second exchange of certificates across the satellite communication system may be avoided through the use of protocols other than the secure SSL protocol. Thus, the use of distributed certificate sharing may facilitate the transfer of the web server certificates, and the identification of the web server, across the tunneled network A2 to the web browser via the RPA, and vice versa. The transfer of master secret keys $MS.sub.1$ and $MS.sub.2$, as shown in FIG. 9, is representative of master keys generated as the result of certificate sharing.

Although a certificate returned to the browser from the RPA, in link A1, may indicate a connection to the web server, for example, amazon.com, there may not be a direct connection between the browser and the web server, much less the HPA and the RPA. Moreover, the certificate exchange between the HPA and the web server may be transmitted through a separate encrypted connection from that of the certificate exchange between the RPA and the browser. Thus, although the browser may receive an indication that suggests the browser is communicating with the remote web server, there may in fact be no direct link between the two, and the certificate received at the browser may not be transmitted the certificate generated by the web server, and the certificate received at the web browser may not be the certificate generated by the server, if necessary. Nevertheless, because the browser receives a certificate indicating that the certificate was generated by the web server of interest, the browser may determine that it is communicating with the web server, when in fact it may be communicating with an RPA which may be located proximate the browser location. In the technique of this exemplary embodiment, acceleration of the secure protocol data via generation of a certificate and transmission to the browser on link A1 illustrated in FIG. 7B, may provide a unique implementation of secure communications. This implementation may operate as follows.

To successfully maintain a secure connection between a browser and a web site employing any secure protocol requiring a certificate, the RPA may be provided with a certificate authority. This certificate authority in the RPA might be, for example, a Spacenet Certificate Authority. Ensuring that the browser recognizes the certificate authority transmitted from the RPA as a recognized certificate authority may be accomplished through a number of techniques, including at least registration of the certificate authority utilized in the RPA, through use of a currently-recognized certificate authority such as Verisign™, dynamically as discussed post, among other techniques.

Certificates may be created using any standard tool. As noted, certificates are typically valid for a certain period of time and may include various extensions in the certificate. The certificate may be created using, for example, a signature algorithm, a public key, a subject identifier and/or authority identifier. Through the use of the importation button, the user may then import as a trusted certificate authority any suitable certificate authority from the RPA, such as one provided by Spacenet and/or any other satellite or wireless provider.

In alternative embodiments, the designation of Spacenet and/or any other satellite or wireless provider may be incorporated manually, or the designation may be automated such that the certificate authority is automatically imported. In alternative embodiments, the certificate authority of the satellite and/or wireless network may be preregistered and incorporated into the browsers as distributed to the end users. The certificate may present a security alert when, for example, the certificate is either (a) not from a trusted certifying authority, (b) the certificate date is not valid, or (c) the security certificate is invalid or does not match the name of the site, or based on any number of checks. In the event that the certificate is invalid, the user may alternatively view the certificate. When viewing the certificate, the certificate may present the entity that issued the certificates, such as a web site, for example, amazon.com. Additionally, the certificate may identify the issuing authority, for example, Spacenet, Inc., and the dates for which the certificate is valid.

For a connection to a secure site, the web browser might typically include in the address designation the "HTTPS:" window, where the "S" stands for a secure link. For example, the address window might display "https://amazon.com", indicating a secure link with amazon.com. As a further indication of a secure link, the web browser may alternatively include a depiction indicating that the communication is a secure communication, for example, the bottom right-hand corner of the display might include a picture of a lock which is closed, indicating that the connection is in fact, currently secured or providing any number of indications.

Absent secure protocol acceleration, processing time for accessing a secure web page over a satellite communications system may be noticeably increased. For example, various images contained in a typical web page may appear slowly over time, often one image of the page appearing after the next. In the acceleration mode, the web page may appear complete in substantially shorter amount of time. This effect may be due in part to the fact that using an RPA accelerator, for example, the number of GETs sent over the tunnel may be reduced to a single GET request, whereas the number of GETs actually transmitted by the browser, but intercepted by the RPA, may be a far greater number.

In accordance with the invention, the total number of URLs received from the tunnel may be 12, whereas the total image pre-fetched from the tunnel may also be 12. The total number of URLs received from the tunnel may be the number of URLs pre-fetched from the HPA and then forwarded from the tunnel to the RPA, which then may be forwarded to the browser upon request. In certain circumstances, the RPA may receive pre-fetched images which are not sent to the browser. In this circumstance, the RPA may simply discard the pre-fetched image.

In yet another embodiment of the invention, the certificate authority in an RPA may generate a series of certificates for each of a plurality of different web server hosts. In one embodiment, the RPA may dynamically generate a certificate for each web server host that is requested by the browser. Such dynamic generation of certificates is preferred over techniques that generate certificates in advance because the number of web servers is constantly changing and it is virtually impossible to generate all anticipated web server locations. Accordingly, a dynamic process is utilized to dynamically generate certificates for each web server that the browser intends to access. In this manner, when the browser accesses the RPA, a certificate associated with the web server may be generated in real time and returned to the browser. The certificate generated by the RPA may be cashed for future use.

The authenticity of the browser may also then be checked on the HPA side to ensure that in fact the correct certificate has been generated by the browser, assuming such a certificate is necessary. In the event that the HPA obtains an invalid certificate from the RPA or browser, the error may then be transmitted back to the RPA such that the RPA will then disconnect from the browser. In this manner, errors from the HPA may then be replicated to the browser via the RPA, thus achieving an accurate representation of the secure connection.

Figure 10:
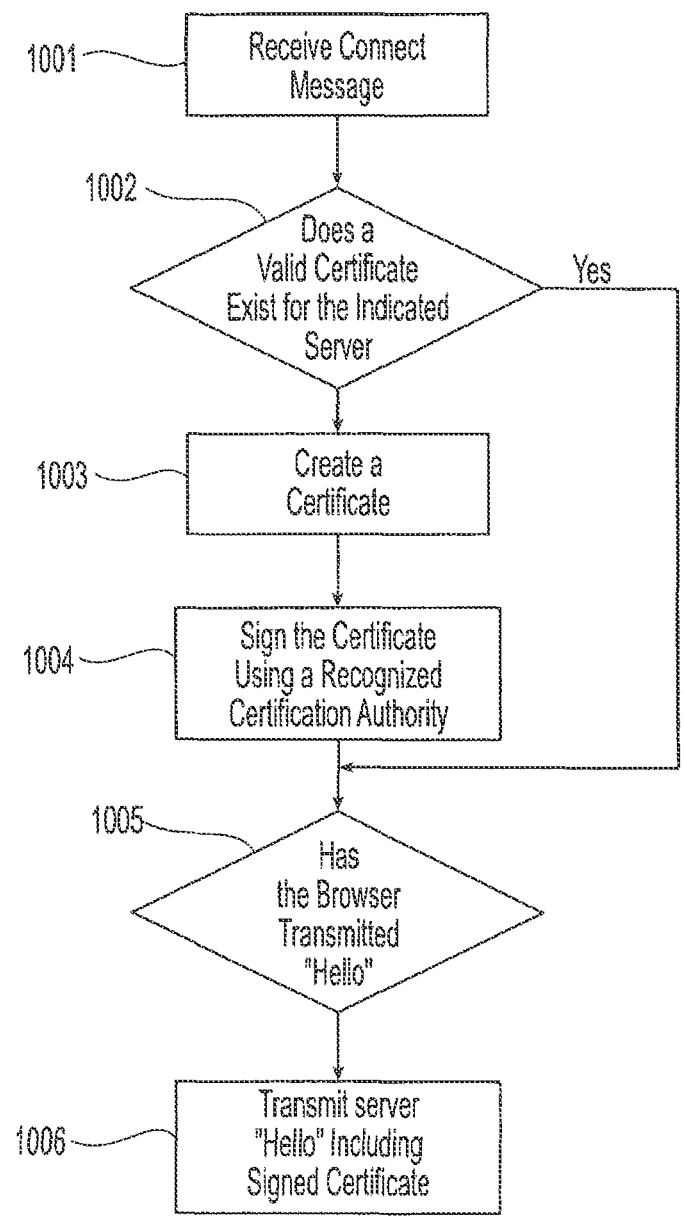
FIG. 10 is a flowchart illustrating a simplified process for dynamically generating a certificate.

FIG. 10 is a flowchart illustrating a simplified process for dynamically generating a certificate. In the dynamic creation of the certificate, the protocol may incorporate an initial connect message indicating the server is to be connected to the browser. Upon receipt of the connect messages, illustrated as step 1001, the RPA may dynamically create a certificate signed using its own certificate authority for the indicated web server, which may include a public and private key if a valid certificate does not already exist, as shown in step 1002. In this case, the web server may be, for example, amazon.com. Thus, the unsigned certificate created in step 1003, may be the certificate for amazon.com, which may be created locally in the RPA, and may contain the information previously described. In the generation of the certificate, which may preferably be performed dynamically, the last step requires the certificate authority to sign the certificate using certificate authority's signature, as illustrated in step 1004. However, as noted, any certificate authority which may be recognized by the browser may alternatively be utilized.

In the secure communication protocol of FIG. 9, after the CONNECT message has been received by the browser, an "OK" message may be sent from the RPA to the browser. The "HELLO" message may be transmitted by the browser to the server/RPA in response to the "OK" message, and may be detected as shown in step 1005 of FIG. 10. The time required for this handshaking to take place may be used by the RPA to dynamically generate the appropriate certificate, and thereby perform steps 1003 and 1004 of FIG. 10. Then, once the RPA receives a "HELLO" signal from the browser, and once the certificate is complete, the RPA may generate a server "HELLO" including the signed certificate, as illustrated in step 1006. Accordingly, due to the delay of the handshake, and the use of this time to generate a certificate as described with respect to this exemplary embodiment, no additional overhead time may be required for the dynamic generation of the certificates in the RPA. Thus, one aspect of the invention may include the dynamic creation of certificates while handshake is progressing.

As described, in response to the "OK", a client "HELLO" is sent from the browser to the RPA, not shown. In step 1006, the RPA then follows with a server "HELLO", which contains the certificate that was generated, for example, during the delay of the "OK" and client "HELLO" handshake between the browser and the RPA. Of course, generation of a valid certificate may occur at any time before it is needed by the RPA to maintain efficient communications.

When the browser receives the certificate, a check may be made to ensure that the host name supplied by the certificate is in fact the same as the host name requested by the browser. Additional checks may include the date of the certificate to ensure that the certificate is still a valid certificate. Thus, in the dynamic creation of the certificate, care may be taken to ensure that the certificate is created with a valid date, if necessary. In an additional step of the verification process, the browser may ensure that the certificate from the RPA was in fact created by an authorized certificate authority.

Where a new certificate authority is utilized in the dynamic creation of certificates, such as the addition of Spacenet to the list of approved authorities, that process may include for automatically adding Spacenet to the list of approved authorities and/or guiding the user through the process of installing an additional certificate authority. However, in the most preferred embodiments, the browser does not need to have a new certificate authority incorporated because the RPA will utilize a certificate authority pre-approved by the browser manufacturer and/or a certificate authority that may already be incorporated into the browser. In this exemplary method, the company implementing the RPA may contract with an already approved certificate authority in order to implement a new certificate authority. For example, where the RPA is incorporated into an indoor unit or the like, the manufacturer of the indoor unit may contract with a pre-approved certificate authority such as Verisign™ so that the certificate authority for Verisign™ would be incorporated into the indoor unit.

In alternative embodiments, the certificate authority may be authorized in the browser. For example, in Internet Explorer™, users may access Internet options, click on the tab "content" and identify certificates. By clicking on the certificate button, it is possible to be presented with a subfolder which includes an option to import a certificate authority. The import button allows the importation of an alternative certificate authority. Using the import button, a user may import alternative trusted route certificate authorities. By clicking on the trusted route certificate authorities tab, the trusted route certificate authorities may optionally be presented in the window associated with the dialogue box. By selecting space in the view button, the information relevant to the certificate may be presented.

As an alternative technique to the present invention, the RPA client may be incorporated directly into the browser. In these embodiments, the acceleration need not occur in the manner suggested, and many steps may be avoided. By incorporating the RPA directly into the browser, a much more efficient connection may be utilized while still achieving the objectives described herein. In this exemplary embodiment, a user operating over a satellite link may select an option in an Internet dropdown tool box for either a satellite or wireless connection. In these embodiments, the implementation of the RPA directly into the browser may facilitate a substantial reduction in latency for those devices. For example, the user of a Palm™ hand-held device, Blackberry™ hand-held device, or other portable device who may wish to reduce the delays across the wireless network may incorporate the RPA directly into the browser of the device. In this manner, there is no need for a separate RPA client and the functionality of the RPA may be incorporated directly into the browser, which may eliminate the need for a number of the process steps described above. In using this technique, there may be no need for a handshake exchange between the browser and the RPA on the client's side. The browser may simply accept the certificate as having been validly returned from the web server. The browser may then become the RPA and requests may be sent directly to the HPA and eventually to the web server, from the browser, bypassing any need for the RPA. Thus, the teachings of an embodiment of the present invention may accelerate wireless remote Internet connections in a variety of environments.

Figure 7B:
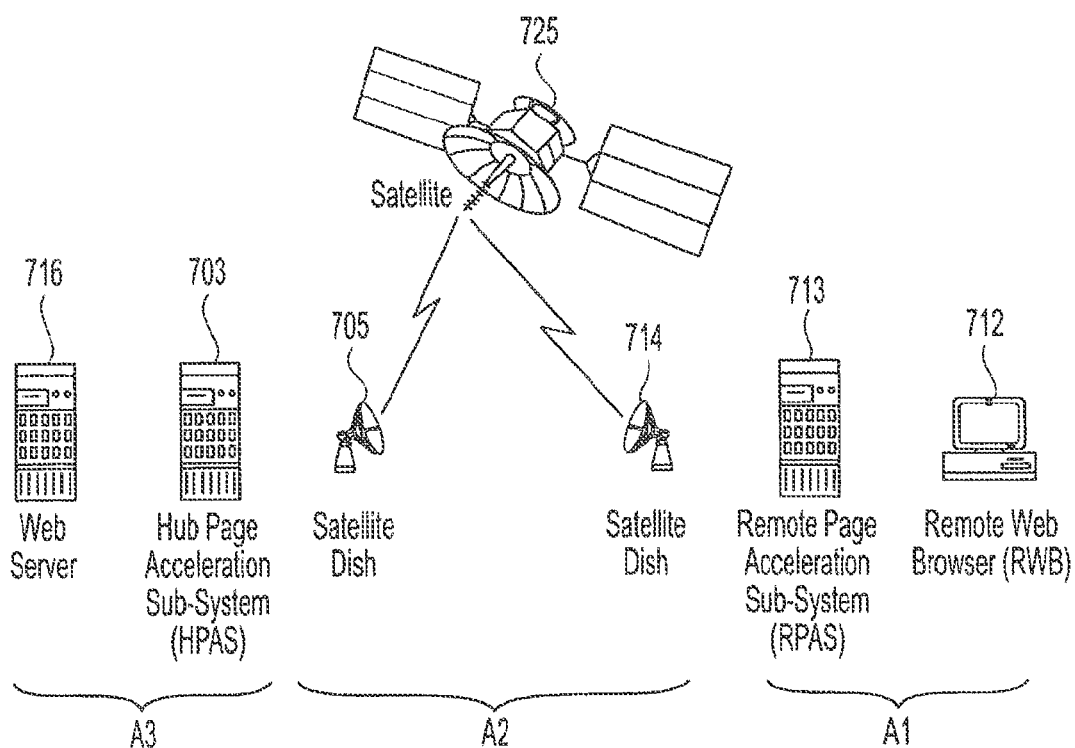
FIG. 7B is a simplified schematic block diagram illustrating the connections between the various subcomponents creating a secure connection between a web browser and a web server over a satellite communication system in accordance with a preferred embodiment of the present invention.

Security between the RPA and the HPA may be provided using standard tunneling connection across the wireless connection A2 of FIG. 7B. In the standard tunneling connection across A2 of FIG. 7B, the HPA and hub server may have built-in authentication techniques for ensuring that transmissions from the RPA are in fact coming from a particular remote terminal device and thus can identify the source address of the remote terminal device for forwarding to the web server. In this way, the web server may ensure that the identity of the particular receiver is correct. In still further embodiments of the invention, the license screen which installs the browser and/or RPA software may seek permission from the user to install an alternative certificate authority. In this way, the user is fully informed of his legal rights with respect to the installation of the certificate authority and the software installing certificate authority seeks waiver from the user of any legal liability associated with the inclusion of an alternative certificate authority. Thus, embodiments of the present invention contemplate the business method of seeking a waiver for the installation of a certificate authority associated with the RPA for dynamically generating certificates in the RPA.

In the preceding description of a preferred embodiment for the establishment of a secure connection between a browser and a web server, the secure transmission was described as having initially been transmitted in accordance with the Secure Sockets Layer protocol. The present invention is applicable to facilitate the transmission of data over a satellite communications system or other wireless network for which the communication was originally designed to be transmitted in accordance with any secure communication protocol. Thus, the present invention is applicable to communications originally transmitted using any secure protocol.

What is claimed is:

1. A method, comprising:
   receiving, at a device, a data page request from a remote station via a satellite link, the data page request indicating a data page to be retrieved, the data page request including a cookie comprising information related to the remote station;
   identifying, by the device, a network address associated with the data page;
   establishing a connection with a second device associated with the network address;
   requesting, by the device, the data page from the second device associated with the network address;
   receiving, at the device, the data page from the second device;
   requesting, by the device, a plurality of objects referenced in the data page, wherein at least one of the plurality of objects is associated with the cookie;
   compiling the plurality of objects into a data cluster;
   compressing the data cluster;
   transmitting the data cluster to the remote station;
   receiving, from the remote station via the satellite link, a second data page request, the second data page request indicating a second data page to be retrieved, the second data page request not including the cookie;
   requesting the second data page, the requesting the second data page comprising transmitting the cookie;
   receiving the second data page; and
   transmitting the second data page to the remote station.

2. The method of claim 1, wherein the identifying the network address comprises:
   generating and transmitting, by the device, a DNS request; and
   receiving, at the device, an internet protocol (IP) address in response to the DNS request.

3. The method of claim 1, wherein the identifying the network address comprises:
   searching, by the device, a locally stored DNS table for an internet protocol (IP) address corresponding to the requested data page; and
   retrieving, by the device, the IP address corresponding to the requested data page.

4. The method of claim 1, further comprising storing, in a local cache, the cookie included within the data page request.

5. The method of claim 4, wherein the local cache is included within the device.

6. The method of claim 1, wherein the transmitting the data cluster comprises transmitting the data cluster as a multicast transmission.

7. The method of claim 1, further comprising parsing the data page to determine the plurality of objects to be requested.

8. The method of claim 1, further comprising assembling the plurality of objects to be requested into a plurality of lists.

9. The method of claim 8, wherein the assembling comprises assembling the plurality of objects to be requested into the plurality of lists based on a web server associated with each object such that separate lists include objects associated with separate web servers.

10. The method of claim 9, wherein the requesting the plurality of objects further comprises transmitting at least one of the lists to a respective web server.

11. The method of claim 1, further comprising:
    establishing a tunnel over the satellite link between the device and the remote station,
    wherein transmitting the data cluster comprises:
    encapsulating the data cluster in a container having a network address associated with the remote station; and
    transmitting the container to the remote station via the tunnel.

12. The method of claim 11, further comprising:
    using a first encryption to encrypt data for transmission through the tunnel; and
    using a second encryption to encrypt data for transmission through the connection with the second device, the second encryption being different from the first encryption.

13. The method of claim 1, further comprising:
    prior to the transmitting the data cluster, multicasting the data page to the remote station.

14. The method of claim 13, further comprising:
    evaluating contents of the data page; and
    marking the data page as a page to be multicasted based on a result of the evaluating.

15. The method of claim 1, further comprising:
    receiving, at the device, a message indicating a particular page being accessed by the remote station, wherein the requesting the plurality of objects is responsive to the message.

16. The method of claim 1, further comprising:
transmitting, from the device to the remote station, an index marker indicating whether content in a cache at the remote station is up-to-date.

17. The method of claim 1, further comprising processing a script included in the data page, wherein the plurality of objects referenced in the data page comprises one or more objects referenced by the script.

18. An apparatus, comprising:
a processor; and
memory storing computer-executable instructions that, when executed by the processor, cause the apparatus to:
receive a data page request from a remote station via a satellite link, the data page request indicating a data page to be retrieved, the data page request including a cookie comprising information related to the remote station;
identify a network address associated with the data page;
establish a connection with a second device associated with the network address;
request the data page from the second device associated with the network address;
receive the data page from the second device;
request a plurality of objects referenced in the data page, wherein at least one of the plurality of objects is associated with the cookie;
compile the plurality of objects into a data cluster;
compress the data cluster; and
transmit the data cluster to the remote station;
receive, from the remote station via the satellite link, a second data page request, the second data page request indicating a second data page to be retrieved, the second data page request not including the cookie;
request the second data page, the requesting the second data page comprising transmitting the cookie;
receive the second data page; and
transmit the second data page to the remote station.

19. One or more non-transitory computer-readable media storing computer-executable instructions that, when executed by a processor, cause a device to:
receive a data page request from a remote station via a satellite link, the data page request indicating a data page to be retrieved, the data page request including a cookie comprising information related to the remote station;
identify a network address associated with the data page;
establish a connection with a second device associated with the network address;
request the data page from the second device associated with the network address;
receive the data page from the second device;
request a plurality of objects referenced in the data page, wherein at least one of the plurality of objects is associated with the cookie;
compile the plurality of objects into a data cluster;
compress the data cluster;
transmit the data cluster to the remote station;
receive, from the remote station via the satellite link, a second data page request, the second data page request indicating a second data page to be retrieved, the second data page request not including the cookie;
request the second data page, the requesting the second data page comprising transmitting the cookie;
receive the second data page; and
transmit the second data page to the remote station.

\* \* \* \* \*